INVENTORS
GEORGE B. ERSKINE
FINLEY B. HESS
BY
ATTORNEYS

Nov. 10, 1964         F. B. HESS ETAL         3,156,390
                      GLASS CUTTING MACHINE
Filed Nov. 4, 1960                            8 Sheets-Sheet 4

INVENTORS.
GEORGE B. ERSKINE
FINLEY B. HESS
BY
Amster + Levy
ATTORNEYS

Nov. 10, 1964    F. B. HESS ETAL    3,156,390
GLASS CUTTING MACHINE

Filed Nov. 4, 1960    8 Sheets-Sheet 5

INVENTORS
GEORGE B. ERSKINE
BY FINLEY B. HESS
Amster + Levy
ATTORNEYS

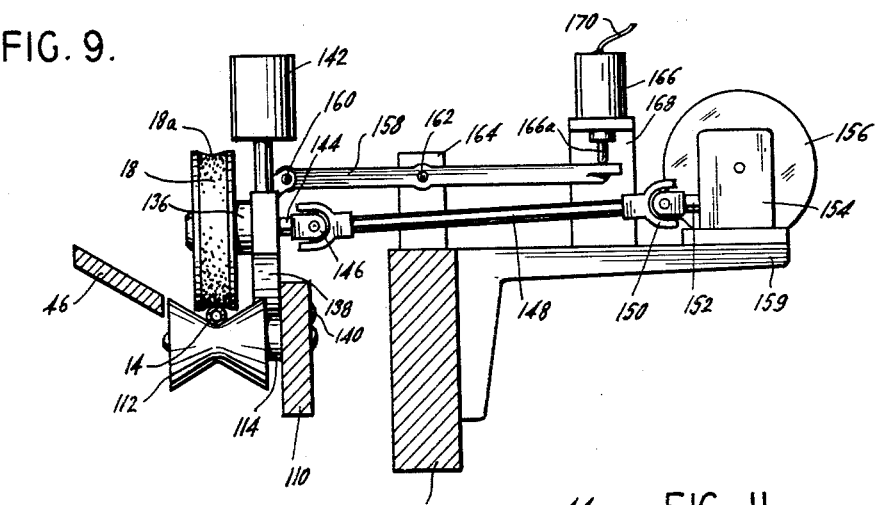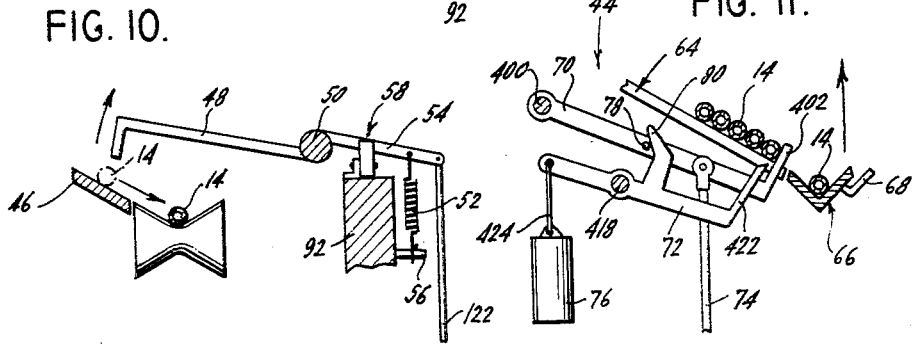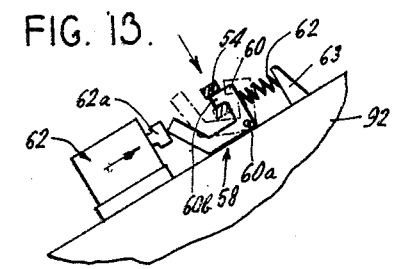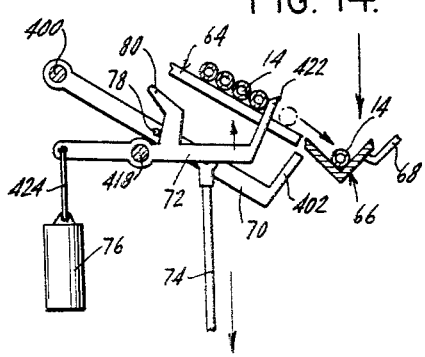

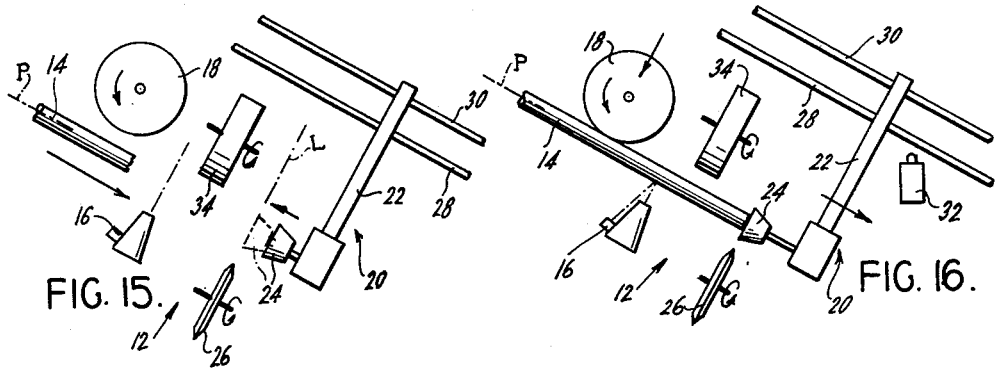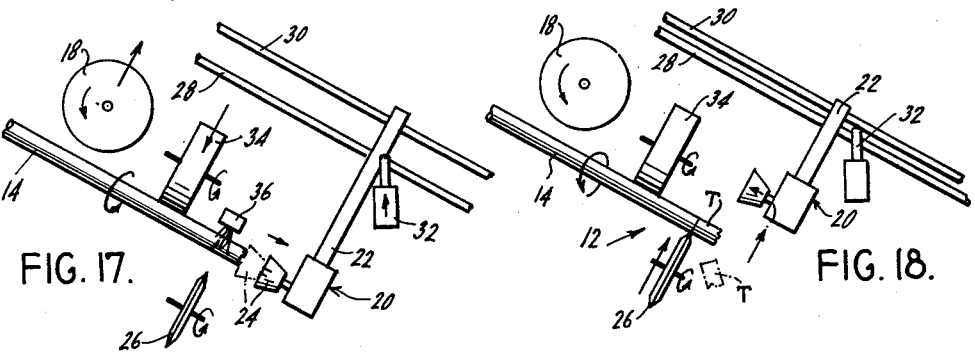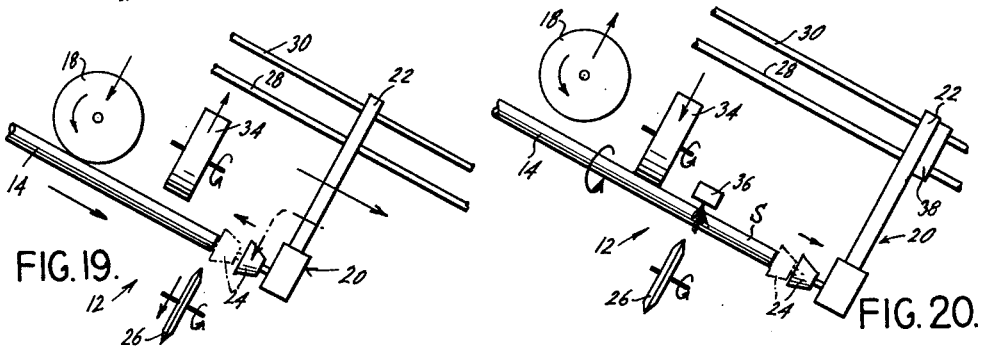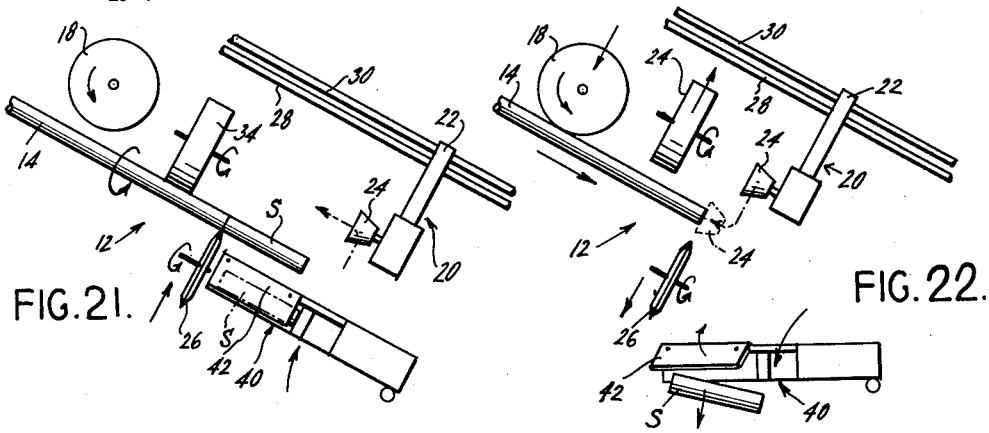

INVENTORS.
GEORGE B. ERSKINE
FINLEY B. HESS
BY
ATTORNEYS

United States Patent Office 3,156,390
Patented Nov. 10, 1964

3,156,390
GLASS CUTTING MACHINE
Finley B. Hess, Brockway, and George B. Erskine, Emporium, Pa., assignors to Brockway Glass Company, Brockway, Pa.
Filed Nov. 4, 1960, Ser. No. 67,278
9 Claims. (Cl. 225—2)

The present invention relates generally to machinery and methods for severing sections from a length of elongated thermoplastic tubing. Specifically, the present invention relates to a glass cutting machine and a method for severing a length of glass tubing into individual longitudinal sections.

In a variety of differing manufacturing processes there is a requirement, at one step of the process, to sever elongated lengths of tubing into a plurality of sections. The number of differing processes and operations in which such a requirement exists is varied and includes the manufacture of a wide range of differing products. One particular application wherein such a severing operation has been found to be particularly advantageous is in the manufacture of glass bottles. In the manufacture of these bottles, the use of sections of tubing as the raw material to be formed in a bottle has been found particularly advantageous. A longitudinal section of thermoplastic tubing, such as glass, is shaped by an assembly machine such that one end of the section of tubing is heated and turned inwardly to form a solid base for the bottle while the other end is suitably heated and shaped into the neck of the bottle. Machines are available to perform this shaping operation on a mass production basis. Since the raw material for such machines is relatively short longitudinal sections of glass tubing, it is advantageous to have a machine and method whereby elongated lengths of thermoplastic tubing, such as glass, may be severed into sections of desired length.

An illustrative embodiment of the present invention provides a machine and method whereby such elongated lengths of thermoplastic tubing are automatically severed into appropriate length sections for use in a manufacturing process, such as described above.

It is a prime requisite of any machine or method for manufacturing a product in relatively large numbers that costs of individual items remain at a relatively low level and that labor requirements are kept at a minimum. Thus, speedy manufacturing operations by automatic or semi-automatic machines on a mass production basis are found to be particularly advantageous. Whereas heretofore methods of severing lengths of glass tubing into relatively short longitudinal sections for further manufacturing operations involved use of either hand severing methods or machinery which was triggered by an operator and fed with individual pieces by an operator, the present invention contemplates a machine and method for the severing of elongated lengths of thermoplastic tubing by a completely automatic means. The present invention contemplates a machine and method of operation wherein once the machine has been adequately stocked with raw material, e.g., lengths of glass tubing, no attention by an operator need be given until all of the contained supply of lengths of tubing have been severed into sections of the desired dimension.

The present invention further contemplates feeding devices and transfer devices which adequately fulfill the individual operational functions within the combination machine.

It is an object of the present invention to provide a glass cutting machine which generally fulfills the requirement as stated above and generally supplies the advantages outlined above. Specifically, it is the object of the present invention to provide a machine for severing lengths of thermoplastic tubing into longitudinal sections of a desired length.

It is a further object of the present invention to provide a manufacturing machine for severing lengths of thermoplastic tubing which will operate on an automatic basis whereby a large number of sections may be produced in a given time at a relatively low unit cost.

It is further within the contemplation of the present invention to provide a method whereby lengths of tubing may be quickly and inexpensively severed into sections of desired length.

It is a further object of the present invention to provide handling means whereby a length of glass tubing may be periodically advanced past appropriate cutting means in order to be severed into appropriate length sections.

It is a further object of the present invention to provide material supply handling means whereby one length of glass tubing at a time will be delivered to an appropriate feed path along which manufacturing processes are accomplished.

It is a further object within the contemplation of the present invention to provide a method whereby lengths of glass tubing are moved, one at a time, from a supply area to a manufacturing area and wherein a length of glass tubing is moved along an appropriate feed path wherein manufacturing operations are accomplished in order to sever sections of desired lengths from the length of glass tubing.

In accordance an illustrative embodiment demonstrating features of the present invention there is provided a machine for severing lengths of thermoplastic tubing into a plurality of longitudinal sections. The machine comprises supply means which are effective to deliver one of said lengths at a time to a transfer location. Guide means are provided which define a feed path which is in direct communication with the transfer location and along which an individual length of tubing is moved by appropriate advancement means which periodically advance the length of tubing a predetermined distance beyond a severing line. Stop means are provided along the feed path at a positioning location selectively spaced beyond the severing line at a distance equal to the desired length of the longitudinal sections which are to be severed from the length of thermoplastic tubing. The stop means are adapted to halt the advancement of the length of tubing at the positioning location. Rotating means are further provided along the feed path which are adapted to hold and rotate the length of glass tubing within the feed path after advancement along the same has been halted by the action of the stop means. Severing means are finally provided at the severing line along the feed path and are adapted to sever a section from the length of tubing in timed sequence to the other operations of the glass cutting machine.

As a further feature of the machine according to the present invention, the tubing supply means comprises a tubing storage bin having an inclined delivery chute in communication therewith and having a discharge opening at its lower end which provides a supply path for the transverse travel of individual length of tubing. A blockage and feed means is provided at the discharge opening of the delivery chute which is adapted to release one of the lengths of tubing at a time onto an elongated tubing transfer device which is pivotally mounted at the discharge opening of the delivery chute. The tubing transfer device is movable between a receiving position wherein the device is adapted to receive a length of tubing from the deliverey chute to a discharge position adjacent to and parallel to the transfer station from which the length of tubing is moved into the feed path.

A further aspect of the machine according to the invention provides a trimming stop which is effective, through the stop means, to initially halt the advancement of a length of tubing beyond the severing line at a distance such that a short trimming section is formed. The severing means are operative, as described above, to sever the length of tubing at the severing line to remove the trimming section such that a clean forward edge is left on the length of tubing for subsequent severing.

As a further feature of the present invention there is provided a method for severing an elongated tubing into a plurality of longitudinal sections. The steps of this method comprise advancing a length of tubing along the feed path and beyond a severing line, blocking the advancement of the forward end of the tubing at a positioning location such that a portion of the tubing extends beyond the severing line which is equal in length to the desired length of the individual longitudinal sections to be produced. Following steps of the method comprise rotating the tubing within the feed path and severing the tubing at the severing line to remove one section from the length of tubing and repeating the aforementioned sequence of steps a plurality of times to sever a plurality of said sections from the length of tubing. In addition the method includes supplying separate lengths of the tubing to the feed path after a prior length of tubing is severed and successively repeating the above mentioned sequence of steps a plurality of times to sever a number of lengths of said tubing into said plurality of sections.

The method according to the present invention further provides the steps of initially advancing each length of tubing along the feed path and blocking same such that only a short trimming section extends beyond the severing line. The tubing is then rotated and severed at the severing line such that the trimming section is removed from the length of tubing such that a clean edge is left on the length of tubing in the feed path. The various steps as outlined above are then performed to sever a plurality of sections from a length of tubing.

The above brief description, as well as further objects, features and advantages of the present invention will be best appreciated by reference to the following detailed description of a presently preferred embodiment, when taken in conjunction with the accompanying drawings wherein:

FIG. 4 is a sectional view taken along the line 4—4 of FIG. 2 and looking in the direction of the arrows illustrating the placement of the locating mechanism and the severing wheel;

FIG. 5 is a partial elevational view of a portion of the glass cutting machine looking in the direction of the arrow 5 in FIG. 3;

FIG. 9 is a sectional view taken along the line 9—9 of FIG. 2 and looking in the direction of the arrows illustrating the drive means and the mounting means for the advancing roller;

FIGS. 10 through 22 are diagrammatical views of the various operations performed by the glass cutting machines. Specifically:

FIG. 10 illustrates the release of a length of tubing from the transfer location into the feed path;

FIG. 11 illustrates the supply mechanism and the transfer means to carry a length of tubing to the transfer location;

FIG. 12 shows the deposit of a length of tubing from the transfer device to the transfer station;

FIG. 13 is a sectional view taken along the line 13—13 of FIG. 12 and looking in the direction of the arrows illustrating the locking member which is effective to hold or release a length of tubing at the transfer location; and FIG. 14, as compared with FIG. 12, illustrates the material supply mechanism delivering one length of tubing at a time to the transfer mechanism;

FIGS. 15 through 22 show, in step-by-step illustrations, the process by which a length of glass tubing is first trimmed and then severed into sections of preselected length which are then deposited in a receiving tray and which are ejected therefrom out of the glass cutting machine. Specifically:

Figure 23:
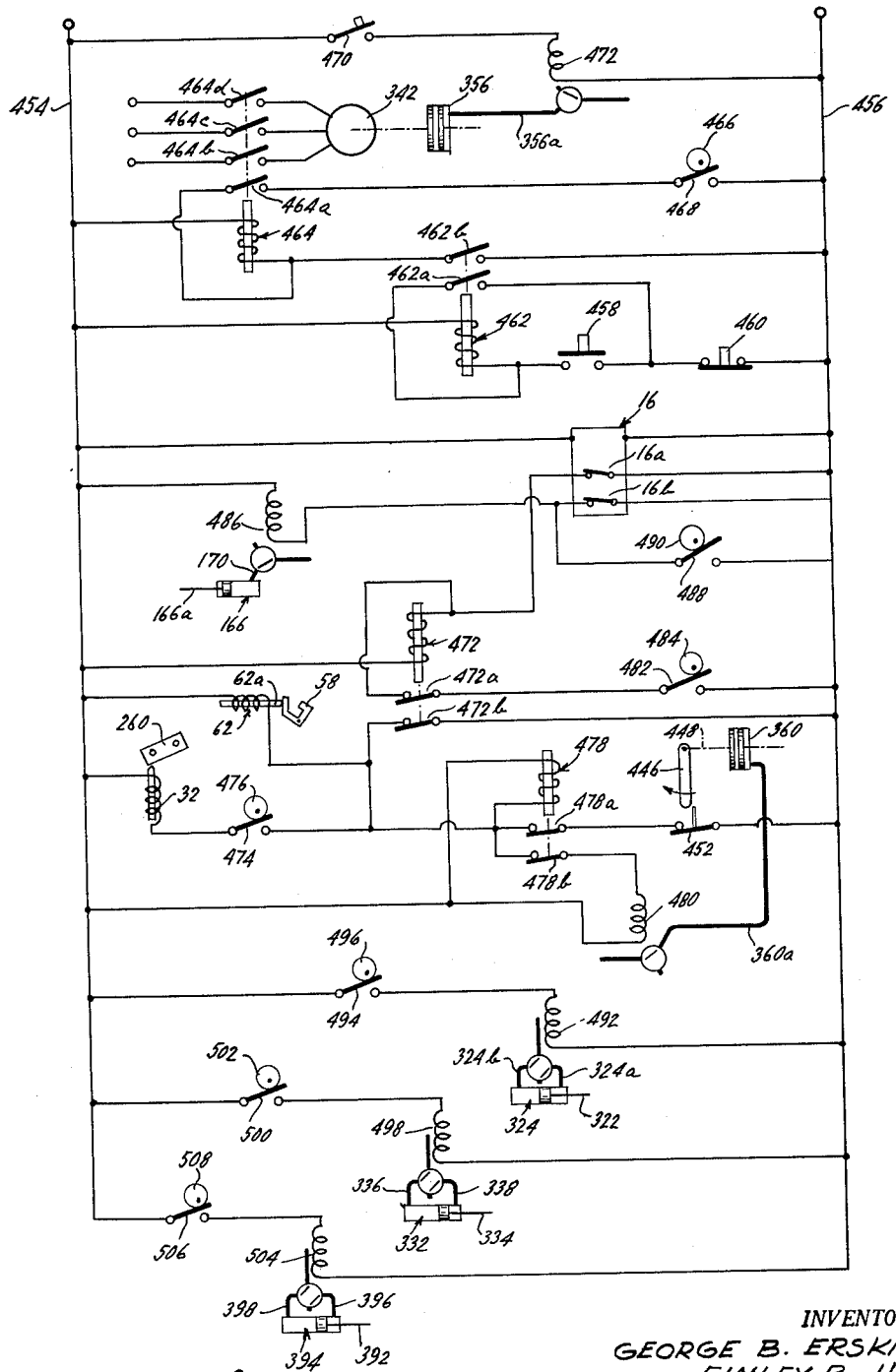

FIG. 15 diagrammatically illustrates the relative positions of several functional parts of the glass cutting machine showing a length of glass tubing in the feed path along which is positioned the advanced roller, the rotating roller, the photoelectric sensing device, the severing wheel and the locating mechanism;

FIG. 16 shows the advanced roller engaged with the length of tubing and advancing same along the feed path;

FIG. 17 illustrates the trim cut stop having engaged the locating mechanism, the advancement roller removed from the tube and the rotating roller in contact therewith. The heating element is shown heating a portion of the tube at the severing line;

FIG. 18 illustrates the severing wheel in contact with the length of tubing cutting of a trimming portion thereof and further illustrates the locating means having been removed from the feed path;

FIG. 19 shows the advance roller advancing the length of tubing along the feed path into contact with the locating mechanism which moves the length of tubing a preselected distance along the feed path;

FIG. 20 shows the advance roller retracted from the glass tubing and the rotating roller in contact therewith, the locating mechanism having stopped the length of tubing at the locating position and having been removed from the end of the glass tubing and the heating element heating the glass tubing;

FIG. 21 illustrates the severing means in contact with the glass tubing at the severing line and further illustrates the receiving tray in position to catch the severed section of glass tubing;

FIG. 22 illustrates the receiving tray having moved to a horizontal position ejecting the sectional glass tubing from the glass cutting machine, the remaining mechanisms assuming relative positions similar to that illustrated in FIG. 19 in preparation for the next severing operation; and FIG. 23 is a schematic view of the various control elements incorporated in the glass cutting machine in accordance with the present invention.

Before reference is made to FIGS. 1 through 9 and 23 for a specific description of the glass cutting machine according to the present invention, reference will be made to the diagrammatical view shown in FIGS. 10 through 21 for a general description of the operations of the glass cutting machine, which is generally designated by the numeral 10 in the drawings. The principal function of the machine 10 is to sever a plurality of longitudinal sections S from an elongated glass tube. The invention herein may be practiced as applied to any one of a large variety of applications involving differing thermoplastic materials, glass tubing being merely illustrative of one example of the materials which may be severed by a machine according to the present invention. This severing function is accomplished at a severing station, generally designated by the numeral 12, which is diagrammatically illustrated in FIGS. 15 to 22. As seen in FIG. 15, a length of glass tubing 14 travels along a feed path P at an angle to the horizontal such that the weight of the glass tubing 14 is sufficient to move the tubing 14 along the path P. A photoelectric cell 16 is stationed along the feed path P and is effective to detect the presence or absence of a glass tubing 14 within the path P. As will be described below, provision is made to supply a new length of tubing 14 upon signal from the photoelectric cell 16. An advanced roller 18 is positioned along the path P for movement into and out of engagement with the glass tubing 14 and is mounted such that when the photoelectric cell 16 detects a tubing 14 in the path P, the advanced wheel 18 is brought, in timed relation to the other operations of the machine 10, into engagement with the tubing 14 for advancement thereof.

A tubing positioning mechanism 20, including the positioning body 22 and the tubing contact body 24, is mounted along the feed path P and is adapted to engage the forward end of the tubing 14 at the severing line L which is defined by the location of the severing wheel 26. The positioning mechanism 20 is mounted on slide bars 28, 30 for movement in a direction parallel to the feed path P. The slide bars 28, 30 are in turn mounted for rotational movement, one about the other. Therefore the positioning mechanism is provided with mounting means allowing for movement axially along the feed path P from the severing line L to a positioning location M. In addition, the mounting means allow movement radially into and out of the feed path P.

As the tubing 14 is moved towards the severing line L under action of the advanced wheel 18, the contact body 24 moves from the solid line position of FIG. 15 to the dotted line position such that its front face is in line with the cutting line L. When the tubing 14 has reached the cutting line L the respective positions of the various components of the severing station 12 are as is diagrammatically shown in FIG. 16. The advanced roller 18 continues to exert a force tending to push the tubing 14 along the feed path P and the locating mechanism 20, now in contact with the tubing 14, moves downwardly a predetermined distance along the feed path P thus allowing the forward motion of the tubing 14.

Since it is a requirement that the end of each section S of cut tubing have uniform edges, it is desirable for the rough ends of the glass tubing to be cut off before production of the finished section S is begun. A trimming stop 32 is therefore provided which halts the travel of the locating mechanism 20 such that the tubing 14 travels only a short distance beyond the cutting line such that a short trimming section T is defined. A comparison of FIGS. 15 and 16 reveals that the positioning body 22 has moved downwardly along the feed path P by sliding on its slide bars 28, 30 and that the trimming stop 32 has moved into position to halt the further travels of the locating mechanism 20.

When the positioning body 22 has moved the full length of its travel, the contact body 24 is retracted from the rough end edge of the tubing 14, and substantially at the same time the advance roller 18 is removed from the tubing 14 and the rotating roller 34 is brought into contact therewith. The rotating roller 34 is journalled on an axis parallel to the feed path P and is effective to both rotate the glass tubing 14 about its own axis and to prevent any axial movement thereof. At the time the rotating roller 34 has moved into contact with the glass tubing 14 a heating element 36 (i.e. a glass burner) is brought into operative relationship with the tubing 14 to heat the area of the tubing which is to be subsequently cut along the severing line L.

After a period of heating has occurred the heater 36 is removed from the feed path P and the severing wheel 26 is engaged against the glass tubing 14. Rotation of both the glass tubing 14 and the severing or cutting wheel 26 is effective to sever the trimming section T from the forward end of the tubing 14.

While the heating and severing operation is being accomplished along the cutting line L, the position mechanism 20 is moved upwardly out of the feed path P and axially thereof such that the positioning body is moved parallel to the feed path P towards the severing line L. After the trimming operation has been completed the positioning body 22 is once again moved downwardly into the feed path P and the contact body 24 is extended to come into contact with the freshly cut end of the glass tubing 14 at the severing line L. Substantially at the time, the contact body 24 contacts the glass tubing 14, the rotating roller 34 is disengaged from the tubing 14 and the advanced roller 18 is again brought into contact therewith. This stage of the operation is diagrammatically illustrated in FIG. 19 where it is indicated that the locating mechanism 20 moves along the feed path P away from the severing line L in a motion similar to that which occurred between the stages shown in FIG. 16 and FIG. 17. Since a trimming cut is not required, the motion of the locating mechanism 20 will provide for a travel of the glass tubing 14 a distance equal to the desired length of the sections S which are to be cut by the glass cutting machine 10.

As seen by a comparison of FIGS. 19 and 20, the positioning body 22 has moved along the feed path P by sliding along the bars 28, 30. When the proper length of tubing 14 has been moved down beyond the cutting line L to produce a section S of the desired size, the tube positioning mechanism 20 hits a selectively positioned stop 38 and further travel of the glass tubing 14 is halted. The contact body 24 is thereupon withdrawn from the end of the tubing 14 and at the same time the rotating roller 34 contacts the tubing 14 and the advance roller is withdrawn therefrom. It will be appreciated that the rotating roller 34 is effective to both rotate the glass tubing 14 about its own axis and, further, to prevent axial movement of the tubing 14 along the feed path P during the heating and severing operations.

After a tube section S of the proper length has been moved past the severing line L, the heating element 36 is brought into the feed path P and is activated to heat the periphery of the tube 14 at the cutting line L. After a heating period is completed the heating element 36 is removed from the feed path P and the severing wheel 26 is moved into engagement with the tubing 14 at the cutting line L. At the same time that the severing wheel 26 is moved into contact with the tubing 14, a pivotally mounted receiving tray is moved into position such that it is adjacent to that portion of the tubing 14 which extends beyond the severing line L. When the severing operation has been completed the section S falls from the tubing 14 into the appropriately positioned receiving tray 40 which, as may be seen by a comparison of FIGS. 21 and 22 moves downwardly to a horizontal position where section S is discharged through the discharge door 42 of the receiving tray 40 onto suitable conveyor means or into a receiving bin.

It should be noted that while the heating operation, shown in FIG. 20, and the severing operation, shown in FIG. 21, are being accomplished, the positioning mechanism 20 is being repositioned for the subsequent cycle of advancement, heating and severing. As seen in FIG. 20, the tubing contact body 24 is retracted from the end of the tubing 14 and then, by the pivotal motion between the slide bars 28, 30, the positioning body 22 is removed from the feed path P and the positioning mechanism 20 is then moved along the slide bars 28, 30 parallel to the feed path P toward the cutting line L, as indicated by the phantom arrow in FIG. 21. At the completion of the severing operations, after the section S has fallen away from the tubing 14, the positioning mechanism is brought down into the feed path P and the tubing contact body 24 is moved to contact the newly cut end of the tubing 14 at the cutting line L. This operation is illustrated by the phantom arrow in FIG. 22.

When the tubing contact body 24 contacts the tubing 14, the rotating roller 34 is removed therefrom and the advance roller 18 is in contact therewith, the sequence of operations is repeated as has been described above and as is illustrated in FIGS. 19 through 22.

With subsequent severing operations of the glass cutting machine 10 the supply of tubing 14 will be exhausted by the number of sections S severed from it. At this point the photoelectric cell 16 detects an absence of tubing 14 within the feed path P and its effective, through mechanisms to be described below, to supply a new length of glass tubing 14 to the supply path P.

Reference will now be made to FIGS. 10 through 14 which diagrammatically illustrate the sequence of operations of the material supply mechanisms 44 which are effective to deliver successive lengths of tubing 14 to the feed path P upon a signal from the photoelectric cell 16. In FIG. 10 there is shown a loading platform 46 upon which is successively placed lengths of glass tubing 14 from the transfer mechanism to be described below. The loading platform 46 is longitudinally parallel to the feed path P and is inclined towards the feed path P in the direction transverse thereto. Immediately adjacent to the loading platform P are the V-shaped rollers 112 which define the beginnings of the feed path P. In FIG. 10 there is shown, in dotted lines, the position which a length of tubing 14 assumes when normally placed upon the loading platform 46. The directional arrows indicate that the blocking arm 48 is moved in an upward direction about its pivot shaft 50 thus releasing the blocked length of tubing 14 which rolls, by the force of gravity, onto the V-shaped roller 112 and into the feed path P. The blocking arms 48 are moved in its clockwise rotation by the action of the spring 52 which is secured at one end to arm 54 which is secured to the pivot shaft 50 and extends in the direction opposite to the blocking arms 48. The tension spring 52 is connected at its other end to the pin 56 on the frame of the machine 10. An effective double-arm lever 48, 54 is thereby created which is biased in the clockwise direction about the pivot 50 by the action of the spring 52. A locking device, generally indicated by the numeral 58, normally prevents the clockwise rotation of the double-arm lever 48, 50 as shown in the sectional view of FIG. 13. The locking device 58 consists of a locking member 60 which is pivotally connected at its lower right hand corner as viewed in FIG. 13, and a solenoid release 62 which is effective to rotate the locking member 60. The locking member 60 is biased in a counterclockwise direction by a compression spring 62 which is placed between the locking member 60 and a mount 63. As is seen in FIG. 13, the upper portion of the locking member 60 normally precludes the downward travel of the arm 54 thereby locking the double arm lever 48, 54 in its blocking position to prevent the travel of a length of glass tubing 14 from the loading platform 46 into the feed path P. However, upon a signal received from a photoelectric cell 16, the solenoid release 62 is activated such that the armature 62a is moved to rotate the locking member 60 about its pivotal mount such that the arm 54 is released for clockwise rotation thereby releasing a length of tubing 14 into the feed path P.

After a length of tubing 14 has been released from the loading platform 46 into the feed path P by the action of the solenoid release 62, it is required that the material supply mechanism 44 place another individual length of glass tubing 14 onto the loading platform 46 in anticipation of the next subsequent demand for a new length of tubing 14 by the glass cutting machine 10. The sequence of operations wherein this is accomplished is shown progressively in FIGS. 11, 12 and 14. In FIG. 11 there is shown a plurality of lengths of tubing 14 placed within an inclined delivery chute 64. Immediately below the exit mouth of the delivery chute 64 there is positioned a transfer device 66 which is effective to tilt a contained length of tubing 14 upward to the tilted orientation of the feed path P and the loading platform 46. As indicated by the arrows in FIGS. 11 and 12, the V-shaped transfer device 66 is rotated about one of its ends in an upward direction such that the transfer device 66 assumes a position parallel to and alongside the loading platform 64. When it reaches that tilted position an extending trip lever 68 is effective to rotate the transfer device 66 about its own axis thus spilling the contained length of tubing 14 out of the transfer device 66 and onto the loading platform 46. After this has been accomplished the transfer device 66 is returned to its horizontal position at the exit of the chute 64 as shown in FIG. 14 to receive another length of tubing 14.

When the transfer device 66 is returned to its horizontal position at the inclined chute 64 the unitary feed arms 70, 72 are effective to release one length of tubing 14 from the chute 64 onto the transfer device 66. This is accomplished through the connecting rod 74 which is pivotally secured to the first arm 70 and driven, as will be described below, at the end of the downward motion of the transfer device 66. It will be appreciated that if the first feed arm 70 be removed from its normal blocking position across the mouth of the inclined chute 64, and no other blocking means were substituted, all of the contained lengths of tubing 14 within the inclined chute 44 would be discharged therefrom. However, provision is made to prevent this by the action of a second feed arm 72 which is pivoted about its central portion and biased for counterclockwise rotation by the hanging weight 76. Its forward end is positioned such that it enters the mouth of the delivery chute 64 behind the normal position of the blocking end of the first feed arm 70 by a distance equal to the diameter of a length of glass tubing 14. Thus, it will be appreciated that when the first blocking member 70 is removed from its blocking position the first length of tubing 14 contained within the delivery chute 64 will be released. However, the second feed arm 72 is immediately moved into its blocking position thus holding the second and subsequent lengths of glass tubing 14 within the delivery chute 64.

The complementary action of the second feed arm 72 upon motion of the first feed arm 70 is achieved by the interaction of the stop 78 located on the first feed arm 70 and the hooked extension 80 on the second feed arm 72. When the first feed arm 70 is moved in a clockwise direction about its pivot point the blocking pin 78 moves downwardly and towards the pivot point of the second feed arm 72. As this motion occurs, the second blocking arm 72 moves in a counterclockwise rotation due to the bias effect of the weight 76 and because of the relative change of positions of the stop pin 78 and the hooked arm 80. This change in position may be best appreciated by a comparison of FIG. 11 with FIG. 14 wherein in FIG. 11 it will be seen that the stop pin 78 is effective to restrict the rotational motion of the second blocking arm 72 by engagement with the hooked finger 80. However, as seen in FIG. 14 when the pin 78 moves towards the pivot point of the second blocking arm 72 the hooked arm 80 is no longer effective to halt counterclockwise rotation of the second blocking member 72 which therefore moves into its blocking position in respect to the delivery chute 64.

The operation described immediately above of the material supply mechanism 44 and the transfer device 66 are activated by a signal from the photoelectric cell 16 when a length of tubing 14 within the feed path P is completely used up by the severing operations at the severing station 12. The photoelectric cell 16 is effective to activate the solenoid release 62 and to deposit a new length of tubing 14 from the loading platform 46 into the feed path P. The transfer device 66 is then effective, in timed sequence, to raise a subsequent length of tubing 14 to its tilted position onto the loading platform 46. The transfer device 66 then returns to its horizontal position after which the first and second feed arms 70, 72 release a single length of tubing 14 from the inclined chute 64 onto the transfer device 66.

The above general description of the sequence of operations of the glass cutting machine 10 illustrate that the present invention provides a machine and method for automatically and continuously severing sections S from length of tubing 14. The disclosed machine according to the present invention provides supply and transfer mechanisms 64, 66 which are effective to supply lengths of glass tubing 14, one at a time, to the feed path P for the operations at the severing station 12 of the machine 10. At the severing station 12 the machine 10 functions to trim the ends of the tubes 14, and to successively cut off sections S of predetermined length. It will be appreciated that the machine as described requires no attention from an operator once the feeding and severing sequence has begun.

Reference will now be made to FIGS. 1 through 9 and 23 for a specific description of the glass cutting machine 10 according to the present invention.

Figure 1:
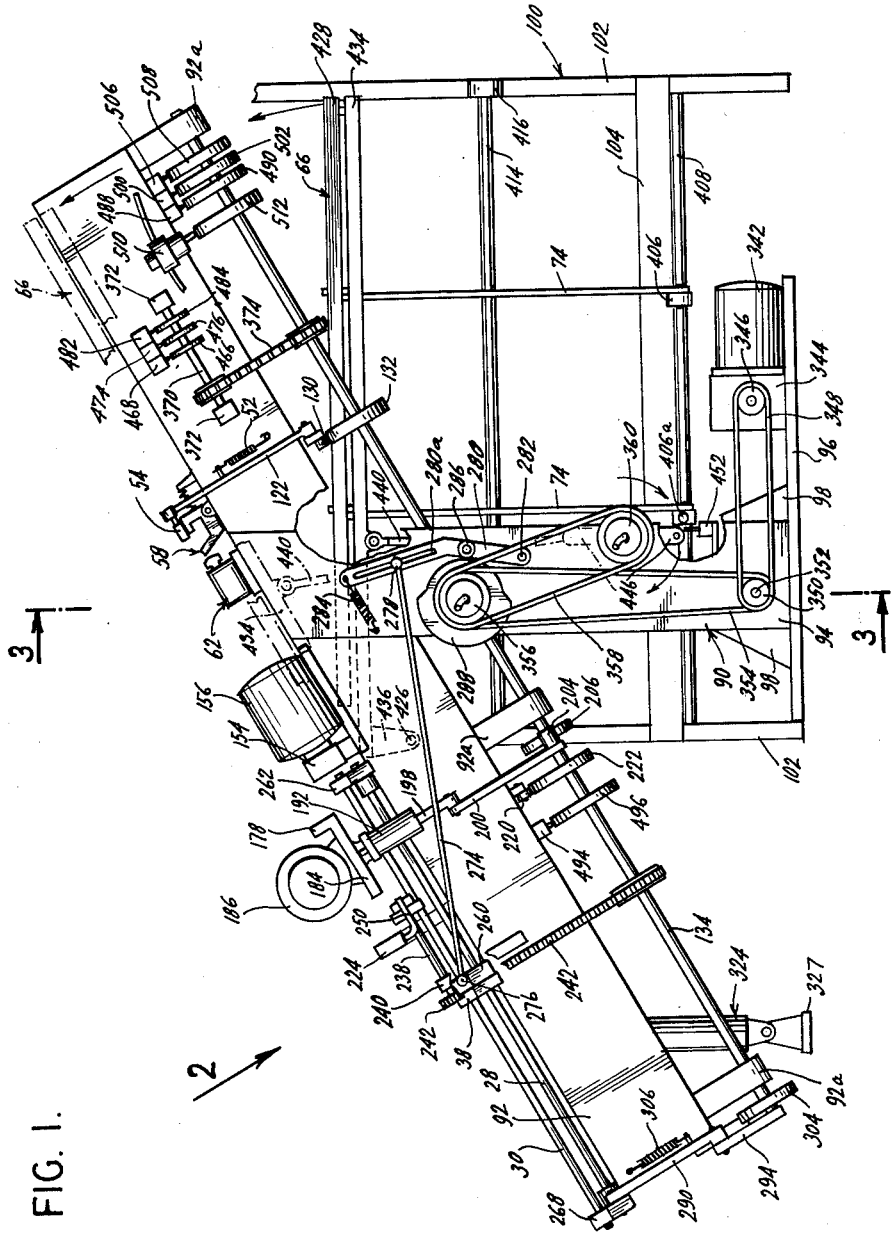
FIG. 1 is an elevational view of a glass cutting machine constructed in accordance with the present invention.
Figure 2:
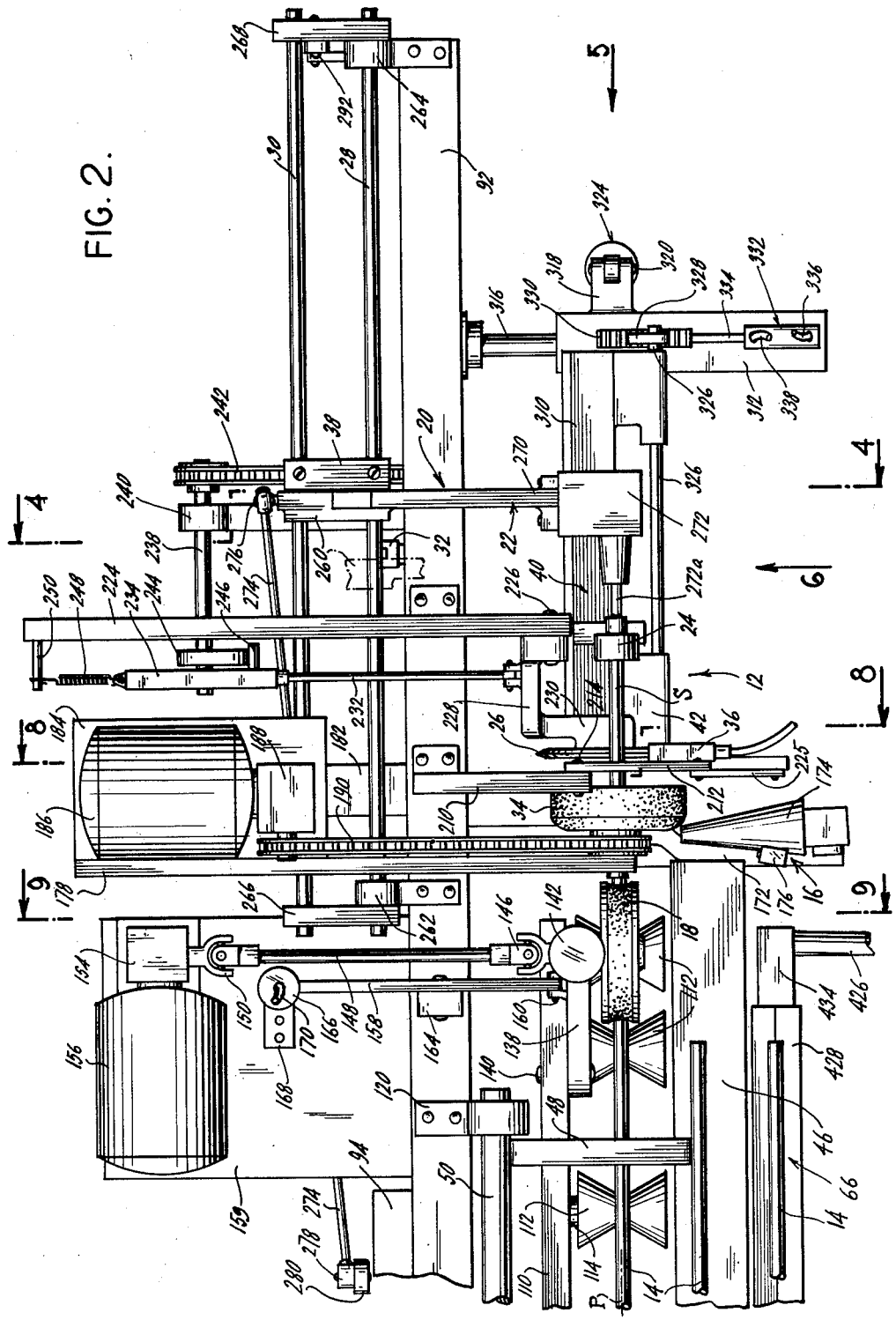
FIG. 2 is an enlarged top view of a portion of the machine shown in FIG. 1 looking in the direction of the arrow 2 in FIG. 1.
Figure 3:
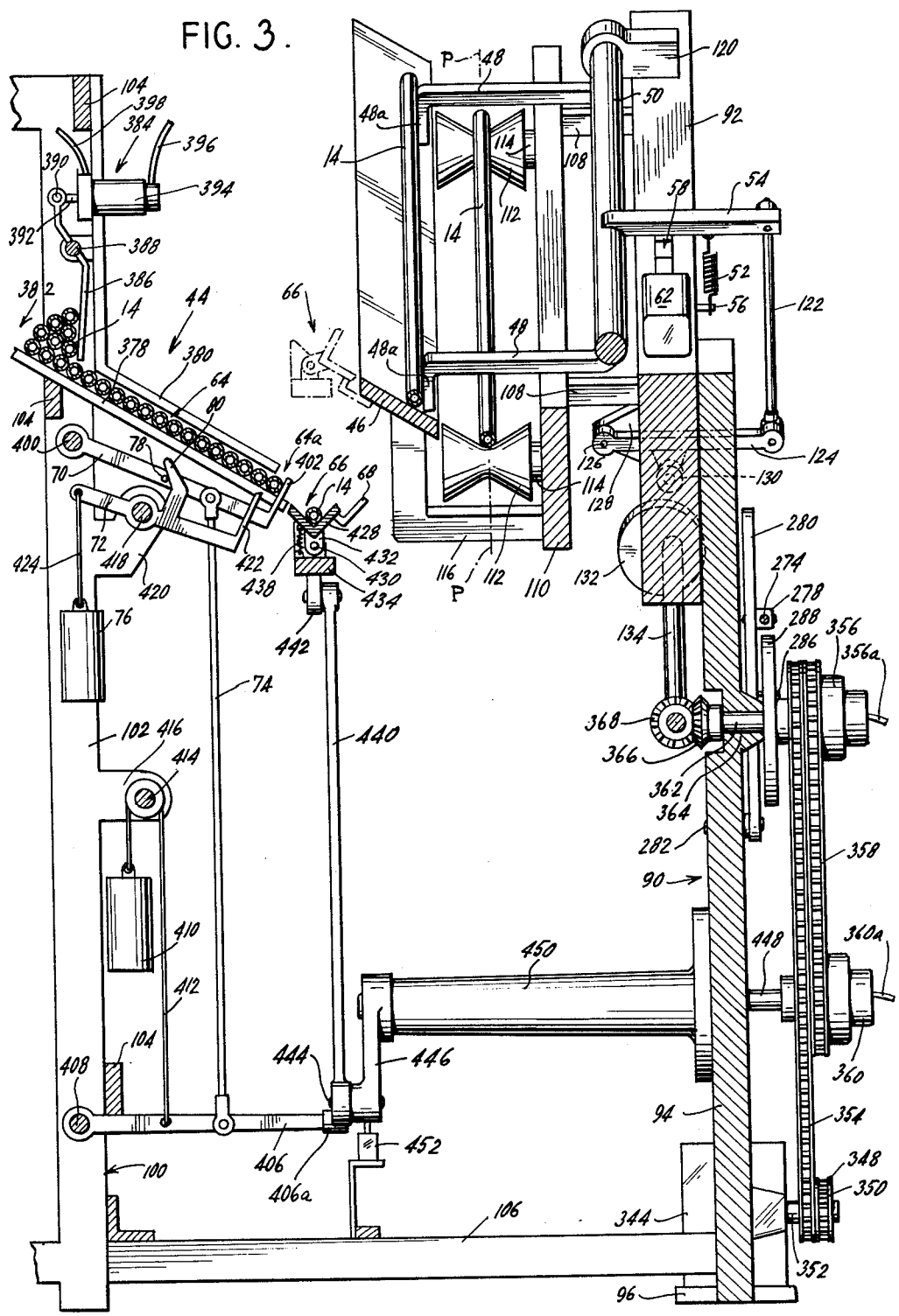
FIG. 3 is a sectional view of the machine as shown in FIG. 1 and taken along the line 3—3 of FIG. 1 and looking in the direction of the arrows and illustrating the main drive mechanism, a portion of the feed path, and the supply mechanism.

The overall construction of the glass cutting machine 10, constructed in accordance with the present invention, may be best appreciated by reference to FIGS. 1, 2 and 3. As was stated above in the general description of the operations of the cutting machine 10, the feed path P is inclined at an angle to the horizontal such that the glass tubing 14 travels in a downward direction as it is severed by the machine 10. The various components of the machine 10 along the feed path P are supported on the main frame 90 and specifically on the main support 92 which is inclined at the angle of the feed path P and which is in turn supported by a vertical support column 94 suitably connected, such as by welding, to the main support 92 at approximately the mid-point thereof. The vertical support column 94 is supported in its vertical orientation by attachment to the base plate 96 with added support contributed by the corner braces 98. The material supply elements of the cutting machine 10 are supported on a secondary supply frame, generally indicated by the numeral 100 which consists of a series of uprights 102 and cross members 104. The material supply frame 100 is connected to the vertical support column 94 by suitable horizontal bracing members 106 (best seen in FIG. 3).

The loading platform 64 and the various guide members which define the feed path P are best seen by examining FIGS. 2 and 3. Extending rearwardly from the main support 92 are arms 108 upon which are mounted a secondary support 110 which is parallel to and spaced from the main support 92. A series of V-shaped rollers 112 are journalled along the secondary support 110 on the bearings 114 and are effective to define a linear feed path P which is parallel to the main support 92 and inclined with respect to the horizontal. The rollers 112 are mounted on the bearings 114 for easy rotation about their own axes and are constructed of a hard material, such as nylon, to provide a relatively low friction component betwen the rollers 14 and a length of glass tubing 14 placed thereupon. As will be seen from the description below, the low friction between the rollers 112 and the length of tubing 14 allows for the rotation of the length of tubing 14 about its own axis while resting within the lowermost part of the V of the rollers 112.

Extending rearwardly from the secondary support 110 are L-shaped support brackets 116 which extend first horizontally and then vertically and upon which is mounted the loading platform base 46. The loading platform 46 is mounted on the brackets 116 such that it is parallel to the feed path P in its longitudinal direction and is inclined towards the feed path P in a direction transverse to the feed path P. It will be therefore appreciated that when a length of tubing 14 is placed upon the loading platform it will tend to roll towards the feed path P and onto the rollers 112.

A supply blocking mechanism is provided to prevent a length of tubing 14 placed upon the loading platform 46 from rolling down into the feed path P. The blocking mechanism comprises the pivot shaft 50 which is journalled for rotation in the bearings 120 which in turn are secured to the main support 92. Extending rearwardly from the pivot shaft 50 are the blocking arms 48 having depending blocking fingers 48a which are effective to prevent a length of tubing 14 from rolling into the feed path P. Extending forwardly from the pivot shaft 50 is the activating arm 54 which in conjunction with the blocking arms 48 create an effective double arm lever 48, 54 which pivots about the pivot shaft 50. It will be appreciated that when the activating arm 54 is moved downwardly, or in a clockwise direction as viewed in FIG. 3, the blocking arm 48 will be lifted upwardly and the blocking fingers 48a will be removed from their blocking position in relationship to the loading platform 46. A tension spring 52 is secured to the activating arm 54 at one end and to a pin 126 on the main frame 92 at its other end and is effective to bias the double arm lever 48, 54 in a clockwise direction. The activating arm 54 is precluded from moving in a clockwise direction by the selective action of the locking device 58 comprising the solenoid release 62 and the locking member 60, as described above in connection with the description of FIG. 13. The locking member 60 is pivotally mounted on the pivot 60a on the main support 92 and is biased in a counterclockwise direction by the spring 62 positioned between the locking member 60 and the block 63. When in its normal biased position, the locking member 60 is effective to prevent downward motion of the activating arm 54 by the action of an extending finger 60b which is effective to block such motion as shown in the solid line configuration of FIG. 13. However, when it is desired to have new length of tubing 14 released into the feed path P the solenoid release 62 is effective to move the locking member 50 in a clockwise direction by the action of the solenoid armature 62a against the locking member 60. When the extending finger 60b of the locking member 60 is no longer positioned under the activating arm 54, the tension spring 52 draws the activating arm 54 downwardly and the blocking arms 48 are removed from their normal blocking position to release a length of tubing 144 contained on the loading platform 46 into the feel path P. The electrical connections which are effective to selectively operate the solenoid release 62 will be described below in detail in connection with the schematic drawings of FIG. 23 describing the overall automatic operation of the glass cutting machine 10.

After the solenoid release 62 is effective to release a length of tubing 14 into the feed path P, the double arm blocking lever 48, 54 is reset into its blocking position, against the bias of the spring 52 by the action of the reset rod 122. The reset rod 122 is connected at its upper end to the forwardmost extremity of the activating arm 54 and at its lower end to a connecting lever 124 which is pivotally mounted at 126 on a frame extension 128 secured to the main support 92. Extending downwardly from the connecting arm 124 (and shown in phantom in FIG. 3) is the follower 130 which engages with a cam 132 which is in turn mounted on the main cam shaft 134. Upon rotation of the main cam shaft 134 (which will be described in detail below) the cam 132 is effective to move the follower 130 in an upward direction and thereby, through the connecting arm 124 and the reset rod 122, to reset the double arm lever 48, 54. When the blocking mechanism has been reset the armature 62a of the release solenoid 62 is withdrawn and the locking member 60 is returned to its counterclockwise locking position.

Reference will now be made to FIGS. 2 and 9 for a description of the drive and mounting means for the advance roller 18. The advance roller 18 is journalled for rotation in a vertical plane above the feed path P on a bearing 136 which is mounted on the advanced roller mounting arm 138. As may be seen in the drawings, the advance roller 18 is positioned immediately above the lowermost V-shaped roller 112 and is adapted for movement into and out of the feed path P by means of the rotation of the advance roller mounting arm 138 about its pivot point 140 on the secondary support 110. The annular tubing contact surface 18a of the advance roller 18 is effective to contact a length of tubing 14 contained within the feed path P when the mounting arm 138 is moved downwardly about the pivot 140, and is effective to release the length of tubing 14 when the mounting arm 138 is rotated upwardly about its pivot 140. A weight 142 is provided mounted on the end of the mounting arm 138 removed from the pivot 140 to bias the mounting arm 138 in a downward direction to present the proper bearing force by the advance wheel 18 on a length of tubing 14.

Drive means for the advance wheel 18 are provided through a shaft extension 144 which passes from the advance wheel 18 through the mounting arm 138 and terminates at a universal joint 146. The universal joint 146 is connected at its other end to the shaft 148 which is in turn connected to a second universal joint 150 which receives power through the output shaft 152 of the gear reduction unit 154. An advance motor 156 transmits rotational power to the input of the gear reduction unit 154 and is effective through the universal 150, the shaft 148, the universal 146 and the shaft extension 144, to drive the advance roller 18. The advanced motor 156 and the gear reduction unit 154 are rigidly secured to the mounting plate and bracket assembly 159 which in turn is mounted on the forward side of the main support 92.

The advanced roller mounting arm is moved about its pivot 140 in time sequence to the other operations of the glass cutting machine 10 by the action of the rocker arm 158 which is pivotally connected at one end to the mounting arm 138 at the pivot 160 and is mounted at its mid-point on a pivot pin 162 which is secured to the mounting bracket 164 which in turn is secured to the main support 92. A pneumatic piston and cylinder assembly 166 is mounted on the bracket 168 contiguous to and immediately above the other end of the rocker arm 158. As may be easily seen in FIG. 9, a supply of air, entering through the supply hose 170 will be effective to drive the piston rod 166a downwardly against the end of the rocker arm 158 to drive same in a clockwise rotation about the pivot pin 162 thereby raising the advanced roller mounting arm 138 such that the advanced wheel 18 is lifted away from a length of tubing 14 in the feed path P. Air is supplied through a solenoid operated valve, to the piston and cylinder 166 which in turn is effective to raise the advanced roller 18 when there is no glass tubing within the feed path P and when the rotating roller 34 is brought into engagement with the glass tubing 14 for rotating the same. The timed sequence of operations will be detailed more fully in the description of FIG. 23 given below.

Figure 8:
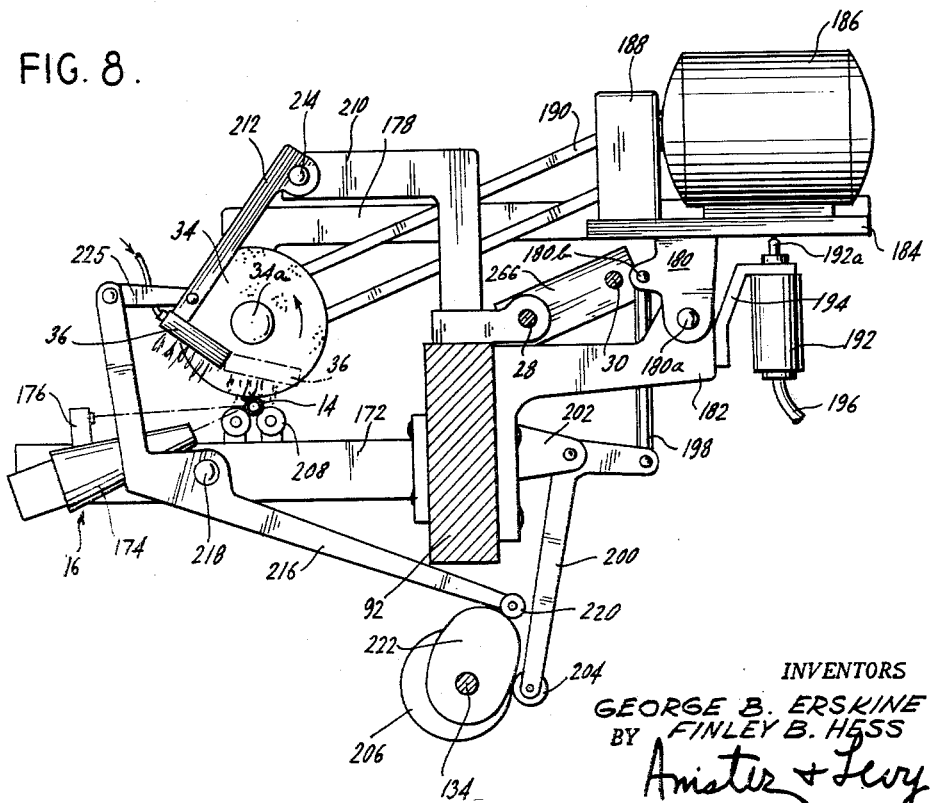
FIG. 8 is a sectional view taken along the lines 8—8 of FIG. 2 and looking in the direction of the arrows illustrating the relative positions of the rotating mechanism, the heating means and the photoelectric cell.

As the length of glass tubing 14 moves downwardly along the feed path P it next encounters the rotating roller 34, the photoelectric cell 16 and the heating element 36, all of which will best be understood by reference to FIGS. 2 and 8. The photoelectric cell unit 16 is mounted on a rearwardly extending mounting arm 172 which is rigidly secured to the main support 92. The photo cell 16 consists of a lamp 174 which directs a beam of light at the feed path P which beam is reflected by a length of tubing 14 within the feed path P back to a photoelectric cell receiving unit 176 which is mounted on the lamp 174. The operations of the photoelectric cell 16 will be described in detail in connection with the description of the schematic drawings of FIG. 23, however, it should be noted that the photoelectric cell 16 is effective to determine the presence or absence of a length of tubing 14 within the feed path P and is effective to transmit a signal, in the form of electric current to a further control means to supply another length of tubing 14 to the feed path P.

The rotating roller 34 is mounted on an axle 34a which is journalled for rotation in the rotating roller mounting arm 178. The mounting arm 178 in turn is pivotally connected, through the bracket 180, to the rotating roller and drive mounting bracket 182 which is secured to the forward side of the main support 92. Rotation of the pivoting bracket 180 about its pivot point 180a is effective to raise and lower the rotating roller mounting bracket 178 and therefore to move the rotating roller 34 into and out of engagement with a length of tubing 14 in the feed path P.

A motor mount plate 184 is rigidly secured to the pivoting bracket 180 and the mounting bracket 178, and the rotating drive motor 186, which is connected to the gear reduction unit 188, is mounted thereon. The output of the gear reduction unit 188 is connected to the drive roller 34 through the sprocket chain 190 which is connected between appropriate sprockets on the output or shaft of the gear reduction unit 88 on the axle 34a of the rotating roller 34. A pneumatic cylinder and piston unit 192 is mounted on a bracket 194 which in turn is mounted on the mounting bracket 182 such that the piston rod 192a contacts the lower portion of the motor mounting plate 184 and is effective to bias the assembly of the mounting bracket 178 and the motor mounting plate 184 in counterclockwise direction about the pivot 180a thus imparting a downward force by the rotating roller 34 against a length of tubing 14 in the feed path P. A supply of air is fed to the cylinder and piston unit 192 by the supply hose 196 and is effective to provide means whereby the pressure of the rotating roller 34 on the glass tubing 14 is easily controlled.

When it is desired to disengage the rotating roller 34 from the glass tubing 14, a connecting rod 198, which is pivotally secured at its upper end to an extension 180b of the pivoting bracket 180, is pushed in an upward direction and is thereby effective to rotate the bracket 178 and the mounting plate 184 in a clockwise direction about the pivot 180a against the bias force exerted by the piston and cylinder unit 192. The connecting rod 198 is moved in this upward path by the bell crank lever 200, one arm of which is pivotally connected to the lower end of the connecting rod 198. The bell crank lever 200 is pivotally mounted on the frame 92 at the mounting bracket 202, the second arm of the bell crank lever 200 having a follower roller 204 connected thereto which is in contact with a cam 206 secured to the main cam shaft 134. It will be appreciated that upon rotation of the main cam shaft 134, the cam 206 will be effected to rotate the bell crank lever 200 about its pivotal mounting point on the bracket 202 and to thereby move the connecting rod 198 in an upward direction. This will, through the mechanisms described above, be effective to remove the rotating roller 34 from the surface of a length of glass tubing 14 within the path P. When the rotating roller 34 is in contact with a length of tubing 14, the tubing is given support by a pair of idler rollers 208 mounted on the mounting arm 172 below the rotating roller 34.

A heater mounting bracket 210 is mounted on the upper surface of the main support 92 and extends upwardly and rearwardly therefrom. At the rearward end of the bracket 210 there is pivotally connected the heater mounting arm 212 at the pivot point 214. At the end of the heater arm 213 removed from the pivot 214 is mounted the heater element 36. As best seen in FIG. 8, the heater element 36 and its mounting arm 212 is rockable about the pivot 214 from an inoperative position illustrated in the solid line configuration to an operative position illustrated in phantom wherein the periphery of the glass tubing 14 is heated along the severing line L.

The heater element 36 is moved into and out of the operative position by the action of the bell crank lever 216 which is pivotally mounted at the pivot 218 on the mounting arm 172. At its lower end the bell crank lever 216 carries a follower roller 220 which lies on the cam 222 which is secured to the main cam shaft 134. At its other end the bell crank lever 216 is pivotally connected to the connecting link 225 which in turn is connected to the heater mounting arm 212. It will be appreciated that upon rotation of the bell crank lever 216 in a clockwise rotation about its pivot point 218, the connecting link 225 will be effective to push the heater mounting arm 212 such that it rotates about its pivot 214 and such that the heater element 36 is moved into its operative position with respect to the feed path P. The bell crank lever 216 is biased in the clockwise direction by a spring (not shown) which is effective to keep the follower 220 on the surface of the cam 222. Thus, upon a rotation of the main cam shaft 134 through a 360° rotation, the heating element 36 will be moved into its operative position with respect to the feed path P for a given period of time and will be moved to its inoperative position for a predetermined period of time. As will be more fully explained below, the main cam shaft rotates once for each cycle of operations in the glass cutting machine 10 such that the cam 222 will rotate once for each cutting operation.

Referring now to FIGS. 2 and 4 for a description of the severing wheel 26 and its mounting assembly, there is provided a T-shaped severing wheel mounting bracket 224 which extends upwardly and then both forwardly and rearwardly from the main support 92. The mounting bracket 224 is positioned along the feed path P at a point slightly beyond the cutting line L. At the rearward end of the support bracket 224 is a pivot 226 on which is mounted the severing wheel arm 228 which hangs downward therefrom and extends below the feed path P and towards the cutting line L. At the lower end of the arm 228 is a rearward and sideward extension 230 which carries the severing wheel 26 in a plane perpendicular to the feed path P and along the severing line L and at a point below the feed path P.

At a point intermediate the wheel mount extension 230 and the pivot point 226 on the arm 228 there is pivotally mounted a push rod 232 which is effective to move the severing wheel arm from its operative position as shown in a solid line configuration of FIG. 4 to its inoperative position as shown in the dotted line of FIG. 4. The push rod 232 is rigidly secured to a sliding block 234 having a lost motion slot 236 formed therein. The sliding block 234 is mounted, through its lost motion slot 236, on the severing wheel auxiliary cam shaft 238 which is mounted for rotation parallel to the feed path P and in suitable bearings contained within a bearing mount 240 which extends from the main support 92 (as seen in FIG. 2) and an extension 224a of the bracket 224 (best seen partially broken away in FIG. 4). The auxiliary cam shaft 238 is driven by the sprocket chain 242 which is suitably connected to the sprocket on the auxiliary cam shaft 238 and the main cam shaft 134 such that there is a one to one ratio of rotation between said shafts. The cam 244 mounted on the cam shaft 238 engages within a follower pin 246 which is rigidly secured to the slide block 234. As seen in FIG. 4 the slide block 234 is biased towards the inoperative position of the severing wheel 26 by the provision of a spring 248 which is effective to draw the slide block 234 towards a downwardly extending mounting pin 250 on the bracket 254. The development of the cam 244 is such that one complete rotation thereof will drive the slide block 234 through a single reciprocating motion. This will be effective, through the push rod 232, to swing the severing wheel 26 from its inoperative position away from the feed path P into its operative position and into contact with a length of tubing 14 within the feed path P as illustrated in FIG. 4.

Drive means for the severing wheel 26 is provided through a motor 252 and a drive belt 254 which is secured to the pulley 252a on the motor 252. At its end removed from the pulley 252a, the drive belt 254 is engaged with the guide pulley 256 which is suitably mounted for rotation upon the support bracket 258 which is in turn to the frame 90 of the glass cutting machine 10. As may be best seen in FIG. 4, when the severing wheel 26 is moved to its operative position with respect to the feed path P the outer periphery of the severing wheel 26 engages the outside surface of the drive belt 254 at a point where the drive belt 254 is in contact with the guide pulley 256. The drive belt 254 is of such construction that the relatively sharp edge of the severing wheel 26 is received without any substantial wear being imparted to the drive belt 254.

From the foregoing it will be appreciated that when the severing wheel cam 244 is effective to move the severing wheel 26 into contact with a length of tubing 14 at the cutting line L and is also effective to move the severing wheel 26 into peripheral contact with the drive belt 254 which is in turn effective to rotate the cutting wheel 26 in a direction opposite to the rotation to the length of tubing 14.

It will be appreciated that each of the above described mechanisms are effective to operate, in an automatic fashion, to sever sections of tubing S from lengths of tubing 14 as they are advanced along the feed path P and beyond the severing line L. The overall control operation of the machine 10 will be described below, however, it will be further appreciated that means must be provided to position lengths of tubing 14 along the feed path P such that sections S of the desired length will extend beyond the cutting line L to be removed by the severing wheel 26. The tube positioning mechanism 20 is effective to provide this function of the glass cutting machine 10.

Figure 6:
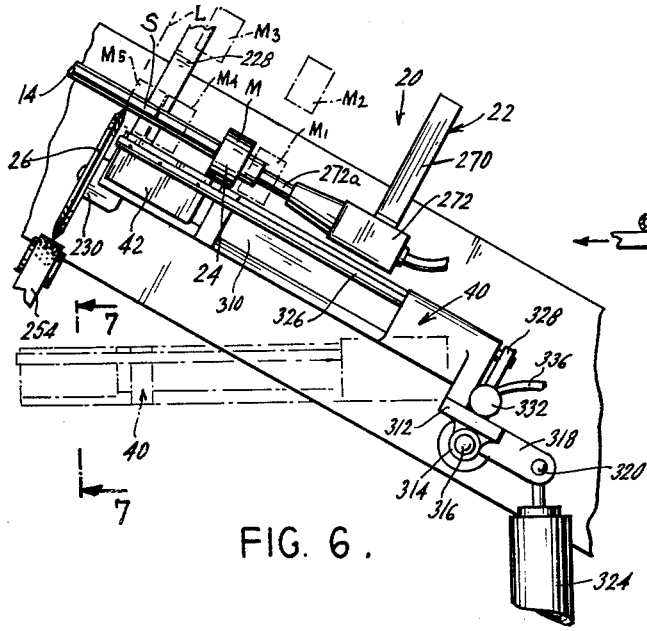
FIG. 6 is a partial elevational view looking in the direction of arrow 6 of FIG. 2 illustrating the receiving tray mechanism and the relative locations of the severing wheel and the locating mechanism.
Figure 7:
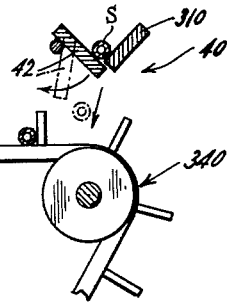
FIG. 7 is a partial elevational and diagrammatical view of the ejection of a severed section of tubing from the receiving tray onto a conveyor transport.

The tubing positioning mechanism 20 and its driving means are best seen in FIGS. 1, 2, 4, 5 and 6. The tube positioning mechanism 20 is mounted by its slide carriage 260 upon the slide bars 28, 30. The first slide bar 28 is mounted for rotation on the main support 92 by means of the bearing fixtures 262, 264. The second slide bar 30 is rigidly secured to the first slide bar 28 in parallel alignment thereto and for rotation thereabout by means of the end fixtures 266, 268. The end fixtures 266, 268 are secured to either end of the first slide bar 28 at a point outside of the bearing fixture 262, 264 and are similarly secured to the ends of the second slide bar 30. It will thus be appreciated that the assembled slide bars 28, 30 and their fixtures 266, 268 may be pivoted as a rectangular unit within the bearings 262, 264. It will be further appreciated that the slide carriage 260 is adapted to slide along the lengths of the slide bar 28, 30 and to therefore move the positioning mechanism 20 axially of the feed path P. The pivotal motion of the rectangular assembly 28, 30, 266, 268 is effective to pivot the carriage 260 and thereby swing the positioning mechanism 20 into and out of the feed path P. Rigidly secured to the carriage 260 is the positioning body 22 which consists of the positioning arm 270 having at its end the piston and cylinder assembly 272. The length of the positioning arm 270 is such that the piston rod 272a of the positioning mechanism 20 and the attached tubing contact body 24 may be exactly aligned with the feed path P. When carriage 260 is moved along the slide bars 28, 30, the positioning mechanism is moved along the axis of the feed path P and when the slide bars 28, 30 are rotated in the bearings 262, 264, the positioning mechanism 20 is lifted upwardly out of the feed path P. Further movement along the feed path P is provided by means of the piston and cylinder assembly 272 and the piston rod 272a upon which is mounted the tubing contact body 24. In the views of FIGS. 2 and 7, the positioning mechanism 20 is shown in the positioning location M with the piston rod 272a holding a section S of tubing at it is positioned in the feed path P preparatory to the heating and cutting operation. The piston and cylinder assembly 272 is controlled in timed sequence to the other operations of the glass cutting machine 10, by the cam operated valve 510 which in turn is governed by the cam 512 mounted on the main cam shaft 134 as seen in FIG. 1.

The connecting rod 274, best seen in FIGS. 1 and 4 is effective to move the positioning mechanism 20 along the slide bars 28, 30. At its upper end the connecting rod 274 has a ball connection 276 with the carriage 260 and at its lower end connected at an adjustable pivotal connection 278 to a lever arm 280. The lever arm 280 is pivotally connected at its lower end to the vertical support 94 at pivot 282 and is biased, by a tension spring 284 connected between its upper end and the vertical support 94, for rotation in a counterclockwise direction. A lost motion slot 280a is provided in the lever arm 280 in which the adjustable connection 278 is made to the connecting rod 274. The adjustable connection 278 and the lost motion slot 280a provide a selectively variable radius arm for the lever 280 from its pivot point 282 to the adjustable connection 278 to the connecting rod 274. Intermediate the lost motion slot 280a and the pivotal connection 282 on the lever arm 280 there is positioned a follower 286 which is effective to engage a cam 288 which rotates once during each cycle of operation of the glass cutting machine 10. The method of rotating the cam 288 will be described in detail in connection with the overall description of the drive mechanism for the glass cutting machine. From the foregoing it will be appreciated that upon rotation of the cam 288 the follower 286 will be effective to move a lever 280 about its pivot point 282 and will thereby, through the connecting rod 274 be effective to move the positioning mechanism 20 along the slide rod 28, 30.

Movement of the positioning mechanism 20 into and out of the feed path P is achieved by rotation of the slide bars 28, 30 within the bearing fixtures 262, 264. The mechanism by which this rotation is accomplished is best seen in FIG. 5 wherein a connecting rod 290 is pivotally secured to the slide fixture 268 at the pivotal connection 292 at its upper end and at its lower end to the bell crank lever 294 at the pivotal connection 296. The bell crank lever 294 is pivotally mounted at 298 on a bracket 300 which is secured to the main support 92. The second arm of the bell crank lever 294 terminates in a follower wheel 302 which rides on a cam 304 secured to the main cam shaft 134. The bell crank lever 294 is biased for movement in a counterclockwise direction, as viewed in FIG. 5 by the tension spring 306 which is connected between the first arm of the lever 294 and a pin 308 secured to the main support 92. Upon clockwise rotation of the cam 304, the bell crank lever 294 will be moved in a clockwise rotation thus drawing the connecting rod 290 downwardly and thereby rotating the assembled slide bars 28, 30 and the fixtures 266, 268 about the axis of the slide bar 28. This rotation about the slide rod 28 will be effective to move the slide carriage 260 in a rotation about the slide bar 28 in a clockwise direction (in FIGS. 4 and 5) and thereby to lift the positioning mechanism 20 upwardly out of the feed path P.

From the foregoing descriptions of the positioning mechanisms 20 and the means by which it is mounted within the glass cutting machine 10, it will be appreciated that movement axially of and transversely to the feed path P may be made by the positioning mechanism 20. Further, it will be appreciated that the piston and cylinder assembly 272 provides additional movement of the tubing contact body 24 along the feed path P. A complete description of the overall operation of the glass cutting machine pin will be given below, however, a brief description of the operation of the positioning mechanism 20 will be given with respect to the other operations in the glass cutting machine 10. As seen in FIG. 6, the tubing contact body 24 is in contact with the section S of glass tubing at the locating position M at the stage of operations wherein the length of glass tubing 14 has been advanced by the advanced roller 18 beyond the severing line L. The tubing contact body 24 will thereupon be retracted by the piston rod 272a as controlled by the cam 512 and valve 510 to the position shown in phantom and indicated as $M_1$. As the contact body 24 is withdrawn to position $M_1$ the rotating roller 34 is brought into contact with the tubing 14 to rotate same and to hold same in position along the feed path P. The positioning mechanism 20 is thereupon lifted out of the feed path P by the action of the cam 304 through the crank lever 294, the connecting rod 290 and the slide rod and fixture assembly 28, 30, 266, 268 such that the contact body 24 assumes the position indicated at $M_2$. While the heating and severing operations are being performed at the severing line L, the positioning mechanism 20 is further moved axially of the feed path P by the action of the connecting rod 274 connected to the carriage slide 260 as driven by the cam 288 operating through the lever arm 280. At the completion of this motion the location of the tube contact body is indicated generally by the designation $M_3$. After the severing operations have been completed at the severing line L, the positioning mechanism 20 is once again lowered into the feed path P by the action of the cam 304, and the tubing contact body 24 takes the dotted line position indicated by the numerical designation $M_4$. Thereupon, the piston and cylinder assembly 272 is effective to drive the tubing contact body 24, via the piston rod 272a, to the cutting line L as indicated at $M_5$ where the contact body 24 touches the newly severed edges of the length of glass tubing 14. The tube positioning mechanism 20 is thereupon moved downwardly along the feed path to the positioning location M shown in full line in FIG. 6 such that a section of tubing S extends beyond the cutting line L which is equal in length to the desired length of the section S to be severed from the tubing 14. The length of this final travel is determined by the positioning stop 38 which is mounted on and slidable along the slide bars 28, 30. Two positioning screws 312, 314 are provided such that the block 38 may be placed at any given position along the length of the slide bars 28, 30. It will be appreciated that spring 284, acting upon the lever arm 280, will be effective to drive the connecting rod 274 and thereby the slide carriage 260 to the desired positioning location M as controlled by the setting of the stop 38.

After a section of tubing S has been severed from the length of tubing at the severing line L, it falls into the receiving tray 40 which is positioned immediately below the feed path P and immediately adjacent the cutting line L. The receiving tray 40 has a generally V-shaped body 310 which is mounted on one end on the bearing plate 312 which is integrally formed on the bearing 314. The bearing 314 is supported for pivotal movement on a rod 316 which extends rearwardly from the main support 92 at a point below the feed path P and removed from the severing line L. A lever arm 318 is connected to the bearing plate 312 and extends in a direction opposite from the V-shaped body 310. At its extremity the lever arm 318 is connected at the pivot 320 to the piston rod 322 of a receiving tray tilting piston and cylinder 324. The piston and cylinder assembly 324 is pivotally connected to a base mount 327. Through the air supply tubes 324a, 324b, the piston and cylinder assembly 324 receives air in timed sequence, as to be described below, which is effective to raise and lower the receiving tray 40 between a tilted receiving position parallel to and immediately below the feed path P and a horizontal discharge position.

Discharge means are provided on the receiving tray 40 by the discharge trap door 42 which is located at the end of the V-shaped body 310 removed from the bearing 314 and bearing plate 312. The discharge door 42 is pivotally mounted on the body 310 by means of the rod 326 which is rigidly secured to the discharge door 42 at one end and is received for rotation within the body 310 of the receiving tray 40 at its other end. A short portion of the rotating rod 326 extends beyond the body 310 of the receiving tray 40 and a pinion 328 is secured thereto. The pinion 328 is engaged within a complementary rack 330 which slides along grooves provided in the surface of the bearing plate 312 and which is activated by a piston and cylinder assembly 332 which is connected thereto by the piston rod 334 for horizontal reciprocation. It will be appreciated, from viewing FIG. 5, that when air is supplied through the input and output tubes 336, 338 the piston rod 334 will be effective to move the rack 330 which will in turn be effective to rotate the pinion 328, the rod 326, and the discharge door 42. In the position shown in FIGS. 5 and 6, the piston rod 334 is in its extended position and the pinion 328 is in its furthest counterclockwise position. When the piston rod 334 is withdrawn within the piston and cylinder assembly 332 the pinion 328 will be rotated in a clockwise direction and the discharge door 42 will be opened. Such a sequence is diagrammatically indicated in FIG. 7 wherein the solid line configurations illustrate a section S of glass tubing held within the receiving tray 40 positioned against the V-shaped body 310 and the discharge door 42. When the piston and cylinder assembly 332 is activated in timed sequence to the lowering of the receiving tray 40, and the other operations of the glass cutting machine 10, the trapped door 42 will be opened as indicated in phantom 42 and the section S of tubing will fall to the provided conveyor transport generally indicated by the numeral 340.

A description of the overall drive means by which the various operations of the glass cutting machine 10 are effectuated will now be given with reference to FIGS. 1 and 3. The main drive motor 342 is mounted on the base plate 46 and is connected directly to the gear reduction unit 344. The output shaft of the gear reduction unit 344 is connected to the sprocket 346 about which is trained the sprocket chain 348 which is connected at its other end to one portion of the double sprocket 350 which is journalled for rotation on the shaft 352 secured to the vertical support 94. About the second sprocket of the double sprocket 350 is connected the sprocket chain 354 which is connected to a sprocket on the main pneumatic clutch 356 which is located above the double sprocket 350 on the vertical support 94. A second linked sprocket on the main clutch 356 is connected by the sprocket chain 358 to the supply clutch 360. It will thus be appreciated that rotational power is delivered from the main supply motor 342 through the gear reduction unit 344 and through the sprocket chains 348, 354 and 358 to the main clutch 356 and the supply clutch 360.

The main pneumatic clutch 356, as well as the supply clutch 360, is of the pneumatic type wherein the outer casing of the clutch rotates with the input of the clutch. When air pressure is delivered through the delivery tube 356a the clutch 356 is effective to mechanically connect its driven input sprocket with the shaft upon which the clutch is mounted. In the case of the main supply clutch 356, the shaft upon which it is mounted is the drive shaft 362 (best seen in FIG. 3) which is mounted for rotation within a bearing 364 formed within the vertical support 94. The drive shaft 362 extends through the vertical support 94 and terminates in a bevelled pinion 366 which mates with a similar bevelled pinion 368 which is secured to the main drive shaft 134. Therefore, when the main clutch 356 is activated rotational powers is passed through the drive shaft 362 to the bevelled gears 366, 368 and then to the main cam shaft 134 which rotates within the bearing 92a positioned beneath the main support 92. The cam 288 is mounted on the drive shaft 362 between the vertical support 94 and the clutch 356 which is effective, as described above to move the positioning mechanisms 20 longitudinally of the feed path P. It will be appreciated that upon activation of the main pneumatic clutch 356 the various above described functions of the glass cutting machine 10 will be performed in timed sequence as dictated by the cams which have been described on the drive shaft 362, on the main cam shaft 134, on the auxiliary cam shaft 238, and further the switching and valve cams to be described more fully below which are mounted on the above mentioned cam shafts and the second auxiliary cam shafts 370. Cam shaft 370 is mounted in bearings 372 on the forward side of the main support 92 and is driven by the sprocket chain 374 connected to suitable sprockets mounted on the auxiliary cam shaft 370 and the main cam shaft 134, the sprocket and sprocket chain 374 being effective to provide a one to one speed relationship between the two cam shafts.

The material supply mechanism 44 and the transfer device 66, briefly described in connection with FIGS. 10 through 14 above, are mounted on the material supply frame 100 and located immediately behind the main machine frame 90 as best seen in FIG. 3. The material supply mechanism 44 comprises the gravity feed chute 64 which includes the base plate 378, the top plate 380 and suitable side members. The supply chute 64 is of elongated shape in the horizontal plane and sized such that the length of tubing 14 may roll transversely down the chute 64 from the storage bin, generally designated by the numeral 382, out of the chute discharge opening 64a towards the transfer device 66. The storage bin 382, partially shown in FIG. 3, includes in its base a continuation of the tilted base plate 378 such that length of tubing 14 located in the storage bin 382 may effectively roll down along the base plate 378 and into the delivery chute 64.

A pulsing mechanism 384 is provided on and within the storage bin 382 to insure that lengths of tubing 14 will continuously roll from the storage bin 382 into the supply chute 64. The pulsing mechanism 384 consists of a dislodging lever 386 which is pivotally mounted within the storage bin 382 on the pivot 388. The lower end of the dislodging lever 386 is located at the entrace to the supply chute 64 and the upper end of the lever 386 is pivotally connected at 390 to the piston rod 392 of the piston and cylinder assembly 394. A supply of air is periodically pulsed through the input and output tubes 396, 398 to activate the piston and cylinder assembly 394 such that the lower end of the dislodging lever 386 is moved in a pulsing motion which is effective to move the lengths of tubing 14 within the bin 382 and to insure the steady flow of lengths of tubing 14 into the supply chute 64.

Located immediately below the storage bin 382 and the supply chute 64 on the material supply frame 100 is the blocking mechanisms which are effective to release one length of tubing 14 at a time out of the delivery chute 64. The first feed arm 70 is pivotally mounted on the upright 102 at pivot 400. The first feed arm 70 has a blocking and feed finger 402 extending at an angle therefrom which is positioned such that rotation of the arm 70 about its pivot 400 is effective to move the blocking 402 into and out of the discharge opening 64a of the delivery chute 64. Intermediate the pivot 400 and the blocking finger 402, a connecting rod 74 is pivotally secured to the feed arm 70 at one end and is connected to the activating arm 406 at its other end. The activating arm 406 is pivotally mounted at pivot 408 at the lower portion of the upright 102 and has secured thereto a weight 410 and cable 412 which is effective, by means of the pulley 414 which is mounted on an extension 416 of the upright 102 above the pivot 408, to bias the activating arm 406 in a counterclockwise direction as viewed in FIG. 3. As the activating arm 406 is moved downwardly against the bias force of the weight 410, the connecting rod 74 will move the first feed arm 70 in a clockwise rotation about its pivot 400 thus removing the blocking and feed finger 402 from the discharge opening 64a of the delivery chute 64. The cross member 104 is utilized to provide a stop for positioning the activating arm 406, and therefore the first feed arm 70, at its normal blocking position.

The second feed arm 72 is pivotally mounted intermediate its ends at the pivot 418 which is located on an extending bracket 420 on the upright 102 immediately below the first arm pivot 400. At the forward end of the second feed arm 72 there is a second blocking on feed finger 422 which is positioned such that the blocking finger 422 will enter the discharge opening 64a of the delivery chute 64 upon counterclockwise rotation of the feed arm 72 at a point behind the normal blocking position of the first blocking finger 402 of the first feed arm 70. The space between the blocking positions of the two blocking and feed fingers 402, 422 is equal to the diameter of a length of glass tubing 14.

The second feed arm 72 is biased for counterclockwise rotation by means of the weight 76 hanging on the cable 424 secured to the rearward end of the second feed arm 72. The bias force due to the weight 76 is opposed by the hooked blocking arm 80 which is engaged against the stop pin 78 located on the first feed arm 70. As seen in FIG. 3, and in FIGS. 11 and 14, the hooked arm 80 is of such a shape, and the relative locations of the pivots 400, 418 and the location of the pin 78 is such that the second feed arm 72 is held out of its blocking position when the first feed arm 70 is in its blocking position. As the first feed arm 70 is withdrawn from its blocking position, the stop pin 78 is moved towards the pivot 418 thus allowing the hooked arm 80 to permit clockwise rotation of the second feed arm 72 and entry of the second blocking finger 422 into the discharge opening 64a of the delivery chute 64. As detailed above, the second blocking extension 422 enters the delivery chute 64 at a point behind the normal location of the first blocking extension 402 such that only one length of glass tubing 14 at a time will be released from the delivery chute 64. The activating means for these mechanisms will be described below in connection with a description of the complete activating means for material supply mechanism 44 and the transfer device 66.

The transfer device 66 is mounted on the frame 100 at the pivot point 426 shown in phantom in FIG. 1. The transfer device 66 consists of an elongated V-shaped channel 428 which is mounted for pivotal motion both about a line parallel to its own axis and transverse thereto about the pivot point 426. The first pivotal motion is achieved through the pivots 430 on the mounting brackets 432 which are connected to the transfer device mounting arm 434 which in turn is mounted at one of its ends on the mounting bracket 436. The bracket 436 is secured to the pivot 426 on the material supply frame 100 for pivotal motion of the transfer device 66 from the horizontal position shown in the solid line configuration of FIG. 1 to the tilted position shown in phantom.

As may be best seen in FIGS. 1 and 3, when the transfer device 66 is rotated about the pivot 426, from its horizontal position to its tilted position, the V-shaped channel is moved from its position at the discharge opening 64a of the supply chute 64 to its tilted position adjacent and parallel to the loading platform 46. When the V-shaped channel 428 is brought into this tilted position, the tripping lever 68, which is secured to the V-shaped channel 428, engages the underside of the loading platform 46 and is effective to rotate the V-shaped channel 428 about its pivotal mounting 430 against the bias force of the spring 438 which is normally effective to maintain the channel 428 in upright orientation. A length of tubing contained within the V-shaped channel 428 will therefore be deposited onto the loading platform 46.

The transfer device 66 is carried through its tilting motion by means of the connecting rod 440 which is pivotally secured at its upper end to the pivot bracket 442 on the lower surface of the transfer device mounting arm 434. At its lower end the connecting rod 440 is pivotally secured at 444 to a crank arm 446. The crank arm 446 is rigidly secured to the supply drive shaft 448 which is mounted for rotation within the housing 450 on the vertical support 94. The supply drive shaft 448 passes through the vertical support 94 and is connected to the material supply clutch 360. Upon activation of the material supply clutch 360, by means of air entering through the entry tube 360a, power is delivered through the shaft 448 and is effective to rotate the crank arm 446 which is thereby effective to raise the connecting rod 440 and to drive the transfer device 66 through its tilting motion. As may be best seen in FIG. 1, wherein the crank arm 446 and the connecting rod 440 may be seen through the broken away portions of the vertical support 94, the crank arm 446 transcribes a 360° arc from its normal vertical downward position wherein the transfer device 66 is in its horizontal position, to a vertical upward position wherein the transfer device 66 is in its upward tilting position as shown in phantom in FIG. 1, and finally through a downward clockwise rotation to its normal rest positions as shown in solid line configuration wherein the transfer device 66 is returned to its horizontal position at the delivery chute 64.

As the crank arm 446 is moved through its rotational motion to drive the transfer device 66, it is also effective to operate the material supply mechanisms 44 in timed sequence such that a length of tubing 14 is delivered to the transfer device 66 after it has transferred a previous length of tubing 14 from the transfer chute 64 to the transfer location on the loading platform 46 and has returned to its horizontal position. This is accomplished by means of a contact surface at the pivot 444 on the end of the crank arm 446 which engages the contact roller 406a located on the end of the activating arm 406. As the crank arm completes its 360° travel it contacts the roller 406a and cams the activating arm 406 in a downward direction. This is effective to lower the first blocking member 70 and the first blocking and feed finger 402 out of the discharge opening 64a of the delivery chute 64 such that a length of tubing 14 falls onto the horizontal V-shaped channel 428. Concurrently, the stop pin 78 and hooked arm 80 are effective to allow the clockwise rotation of the second feed arm 72 such that the second blocking and feed finger 422 precludes further lengths of tubing 14 from rolling out of the supply chute 64. Immediately after contacting the roller 406a of the activating arm 406, the contact surface at the pivot 444 of the crank arm 446 contacts a micro-switch 452 which is effective, as will be described below, to disengage the material supply clutch 360 and thereby to halt further rotational motion of the shaft 448 and the crank arm 446.

It will thus be appreciated that the material supply clutch 360 through the crank arm 446, is effective to activate the transfer device 66 to carry a length of tubing 14 from the discharge opening 64a of the supply chute 64 upwardly to the transfer location on the loading platform 46, and to place a new length of tubing 14 into the transfer device 66 when it is returned to its horizontal position.

Reference will now be made to FIG. 23 for a description of the synchronized operations of the various above described mechanisms of the glass cutting machine 10. Two main power supply lines 454, 456 are provided from which the various operational elements of the glass cutting machine 10 take their electrical power. The advance roller motor 156 and the rotating roller motor 185 are supplied from a separate source of alternating current and are provided with appropriate switches. These two motors 156, 186 operate continuously throughout the cycle of operations of the glass cutting machine 10 and therefore, circuitry for these motors is omitted from the schematic diagram of FIG. 23.

Start and stop switches, generally indicated by the numerals 458, 460 respectively, are provided along a feeder line which also contains the stop-start relay 462. The stop-start switches 458, 460 are spring loaded such that the stop switch 460 is normally closed and the start switch 458 is normally opened. When the start switch 458 is depressed a circuit is completed through the switches 458, 460 and current is supplied to the solenoid of the relay 462. A first holding arm 462a of the relay 462 is closed such that an independent holding circuit is created, through the normally closed stop switch 460, to continue the delivery of power to the relay 462 after the start switch 458 has been released. This is the conventional form of holding relay well known to those skilled in the art. A second switch arm 462b of the relay 462 is effective to complete a circuit to the main motor relay control 464.

The relay 464 is similarly provided with a first contact arm 464a which operates as a holding contact in that it effectively completes an independent circuit to the coil of the relay 464 regardless of the setting of the relay 462. Second, third and fourth switch contact arms 464b, 464c and 464d are provided on each of the three power leads to the three phase main motor 342. A cam 466, mounted on the auxiliary cam shaft 370, is engaged with the switch 468 suitably mounted on the main support 92. The switch 468 is wired in series in the holding circuit formed through the holding contact arm 464a of the motor relay 464. The function of the switch 468, its controlling cam 466 and the holding circuit of the relay 464 is to continue to feed power to the main motor 342 by keeping relay 464 energized even after the stop switch 460 is depressed until such time as the glass cutting machine 10 arrives at the end of a complete cutting cycle such that the machine elements are arranged in their starting positions. When the stop switch 460 is depressed the relay 462 will be deenergized and the circuit to the relay 464 through the contact arm 462b will be broken. However, the independent holding circuit will be effective to keep the coil of relay 464 energized until switch 468 is opened by cam 466. The development of the cam 466 is such that this will occur only at the completion of a severing cycle of the glass cutting machine 10 when the various mechanisms thereof are returned to their starting positions.

A safety control toggle switch 470 is provided in the circuitry of the solenoid controlled valve 472 which in turn is effective to control the main drive clutch 356 through its inlet hose 356a. The toggle switch 470 is normally in a closed position such that power from the main motor 342 is transferred through the main clutch 356. However, when an emergency arises the safety switch 470 may be opened such as to disengage the clutch 356 and halt the supply of mechanical power to the various elements of the glass cutting machine 10. The solenoid controlled valve 472 is supplied with an inlet of air under appropriate pressure from a source not shown, as are each of the valves in the glass cutting machine 10.

It will thus be appreciated that upon depression of the start switch 458 power will be supplied through the relay 462 to the motor control relay 464 such as to start the main motor 342. The main motor 342 may be stopped by depressing the stop button 460, however appropriate holding circuits will be active to continue the rotation of the main motor 342 until such time as a cycle of operations is completed by the glass cutting machine 10. An immediate halt of operations may be accomplished by disengaging the safety control switch 470 which will be effective to disengage the main drive clutch 356.

The photoelectric cell 16 is connected to the main power lines 454, 456 by appropriate circuitry and is effective, as explained above, to detect the absence of a length of tubing 14 within the feed path P. Upon detecting such an absence of a length of tubing 14, the two switch contact arms 16a, 16b are closed. The contact arm 16a is effective to deliver energizing current to the coil of the feeding and trimming relay 472 which includes a first contact arm 472a having a holding function independent of the contact arm 16a and a second contact arm 472b which is effective to deliver current for the activation of the solenoid release 62 of the locking device 58, the trimming stop 32 and the supply clutch 360 of the supply mechanism 44 and transfer device 66. The second contact arm 472b is connected to the power line 456 and transmits current through a first branch to the solenoid release 62 which is effective, through its armature 62a to rotate the locking device 58 such that the blocking arms 48 are elevated allowing a length of tubing 14 to fall from the loading platform 46 into the feed path P as may be seen in FIG. 10.

A second branch of the circuit of the contact arm 472b passes through the switch 474 controlled by the cam 476 on the auxiliary cam shaft 370 and is connected to the coil of the trimming stop 32 such that the carriage 260 of the positioning mechanism 20 is halted at the proper position for the trimming cut. The switch 474 and its activating cam 476 are provided within the circuit to the trimming stop 32 such that energization of the trimming stop 32 is halted after the positioning mechanism 20 is properly located for the severing of a trimming section T from the new length of tubing 14.

A further branch of the circuitry emanating from the second contact arm 472b of the feeding and trimming relay 472 energizes the relay 478 which is effective to control the supply clutch 360 and therefore the transfer mechanism 66 and the material supply mechanism 44. A first switch contact arm 478a provides a holding function for the relay 478 and receives a power supply from the main power line 456 through the material supply stop switch 452, which, upon the completion of the cyclical movement of the transfer mechanism 66, is effective to break the holding circuit through the first contact arm 478a. As was detailed above, when the crank arm 446 completes a 360° travel it is effective to trip the stop switch 452 which, as will be seen from the circuit diagram 23, is effective to interrupt the holding circuit for the relay 478. A second contact arm 478b is effective to energize the solenoid controlled valve 480 which, as shown in FIG. 23 activates the supply clutch 360 through the air supply hose 360a. When the supply clutch 360 is engaged, a direct drive from the main driving elements of the glass cutting machine 10 is effected through the drive shaft 448 to the crank arm 446 which is effective to drive the material supply mechanism 44 and the transfer device 66.

It will thus be appreciated that the first contact arm 16a of the photoelectric cell 16 is effective to energize the relay 472 which in turn is effective to activate the solenoid release 62, the trim stop 32 and the relay 478 which in turn activates the material supply mechanism 44 and the transfer device 66. A holding circuit for the relay 472 is provided through its first contact arm 472a which effectively keeps the relay 472 energized independent of the position of the first contact arm 16a of the photoelectric cell 16. This holding circuit includes as one element a cam operating switch 482 which is effective to interrupt the holding circuit for the relay 472 upon the completion of a trimming cut and after the locking member 58 has been reset. The switch 42 is operated by cam 484 which is mounted on the auxiliary cam shaft 370.

Returning now once again to a consideration of the photoelectric cell 16, there is provided a second contact switch 16b which similarly closes upon the detection of a lack of a length of tubing 14 within the feed path P. The second contact switch 16b is effective to deliver energizing current to the solenoid controlled valve 486 which is effective to elevate the advance roller 18 when energized. The solenoid controlled valve 486 supplies air pressure through the delivery tube 170, to the piston and cylinder assembly 166 which, through its piston rod 166a rotates the lever 158, as shown in FIG. 9, which is effective to lift the advance roller 18 out of the feed path P. A second supply means for the energization of the solenoid controlled valve 486 is provided through a parallel circuit including the advance wheel elevating switch 488 activated by the cam 490 which is mounted on the main cam shaft 134 as best seen in FIG. 1. Upon closing the switch 488 the solenoid controlled valve 486 is effectively energized to elevate the advance roller 18 out of the feed path P. This switch is periodically closed after a length of tubing 14 has been advanced from the severing line L to the positioning location M at which time the rotating roller 34 is moved into contact with the length of tubing 14 by the cam 206 as explained above and as is shown in FIG. 8.

The next two branches of the schematic circuit illustrated in FIG. 23 are solenoid controlled valves which are effective to control the operations of the receiving tray 40. The lifting of the receiving tray 40 from its horizontal discharge position to its tilted receiving position is governed by the solenoid controlled valve 492 which receives energization through the switch 494 which in turn is controlled by the cam 496 mounted on the main cam shaft 134 as shown in FIGS. 1 and 4. The development of the cam 496 is such that the piston rod 322 of the piston and cylinder assembly 324 will be effective to raise the receiving tray 40 to its tilted receiving position in timed sequence to the severing operations of the glass cutting machine 10. Thereupon, the receiving tray 40 will be lowered to its discharge position wherein the sections of tubing will be discharged through the discharge door 42.

The control mechanisms for the discharge door 42 comprise the solenoid controlled valve 498 which is governed by the switch 500 under control of the cam 502 mounted on the main cam shaft 134 as shown in FIG. 1. The developments of the cam 502 is such that the piston rod 334 of the piston and cylinder assembly 332 is pulled inwardly to rotate the pinion 32 in a clockwise direction as viewed in FIG. 5 to thereby open the discharge door 42 when the receiving tray 40 is brought to its horizontal discharged position.

The final elements illustrated in the schematic diagram of FIG. 23 are the control elements for the pulsing mechanism 384 which is effective to insure the smooth flow of lengths of tubing 14 from the supply bin 382 into the material feed chute 64. The piston and cylinder assembly 394 of the pulsing mechanism 384 is governed by a solenoid operated valve 504 under control of the switch 506 which is governed by the cam 508 mounted on the main cam shaft 134 as seen in FIG. 1. The switch 506 is periodically opened and closed such that the piston rod 392 is pulsed which in turn rotates the dislodging lever 386 of the pulsing mechanism 384.

In order to achieve a fuller understanding of the advantages and features of the glass cutting machine 10 including features of the present invention and for a more complete understanding of the above description of that machine, a description of a complete cycle of operations of the machine 10 will now be given.

After a length of tubing 14 has been completely severed into appropriate length sections S in the cutting machine 10, the photoelectric cell 16 is effective to detect a lack of a length of tubing 14 within the feed path P. The contact arm 16a and 16b are thereby closed. The contact arm 16b effectively raises the advanced roller 18 out of the feed path and the contact arm 16a energizes the feeding and trimming relay 472. Relay 472 is effective to activate the solenoid release 62a of the locking member 58 which thereupon raises the blocking arms 48 such that a length of tubing 14 which has been resting on the loading platform 46 rolls downwardly into the feed path P.

Under the impetus of gravity, the length of tubing 14 rolls downwardly along the feed path P wherein it interrupts the beam of light from the photocell 16 such that the contact arm 16a and 16b of the photocell are opened. The feeding and trimming relay 472 remains energized because of its independent holding circuit, however, the second contact arm 16b of the solenoid 16 opens such that the advanced roller 18 is lowered into the feed path P. The advanced roller 18 is effective, as described above in detail, to advance the length of tubing 14 up to and beyond the feed path beyond the severing line L.

Since it is required that the raw end of a new length of tubing 14 be trimmed, the trimming stop 32 is raised by the closing of switch 474 such that the positioning mechanism 20 through its carriage 260 is positioned a short distance beyond the severing line L such that a short trimming section T will be severed from the length of tubing 14. As described above, the end of the tube 14 is received by the tubing contact member 24 which moves with the positioning mechanism 20 to the location beyond the cutting line L such that a short trimming length T extends beyond the severing line L. The tubing contact member 24 is withdrawn by means of the piston and cylinder assembly 272, the advanced roller 18 is raised and the rotating roller 34 is moved into contact with the length of tubing 14. The heating element 36 is thereupon moved into operative relation to heat the periphery of the length of tubing 14 at the cutting line L. The severing wheel 26 is then moved into its severing position and the heating element 36 is removed.

During this time the feeding and supply relay 478 has been activated to engage the material supply clutch 360 such that a length of tubing 14, resting within the V-shaped channel 428 of the transfer device 66 is moved from its horizontal position to its tilted position parallel to the loading platform 46. When the transfer device 66 has reached its tilted position, the V-shaped channel 428 is rotated parallel to its own axis and the length of tubing 14 falls onto the loading platform where it is effectively blocked by the blocking arms 28 which have been returned to their normal blocking position. The transfer device 66 is then returned, by the continued rotation of the crank arm 446, to its horizontal position at the discharge opening 64a of the supply chute 64. When the crank arm 446 has almost completed its 360° rotation, it effectively hits the activating arm 406 which is effective to rotate the first feed arm 70 and the second feed arm 72 so as to release one length of tubing 14 from the feed chute 64 onto the transfer device 66. The crank arm 446 then contacts the material feed stop switch 452 which is effective, as described above, to disengage the material supply clutch 360 and halt operations of the material supply mechanism 44 and the transfer device 66 until the next energization thereof by the photoelectric cell 16.

While the trimming cut is being completed at the severing line L, the positioning mechanism 20 is moved radially outwardly from the feed path P and is moved axially towards the severing line L. When the trimming cut has been completed the positioning mechanism 20 is moved into the feed path P and the tubing contact body 24 is moved to the freshly cut end to the length of tubing 14 at the severing line L. The rotating roller 34 is removed from the length of tubing 14 and the advance roller 18 is once again engaged therewith. The positioning mechanism then moves axially beyond the severing line L to its positioning location M, as governed by the adjustable stop 38, such that a length of tubing 14 equal to the length of the desired section S extends beyond the severing line L. The advanced roller 18 is thereupon lifted out of the feed path P by the action of the cam 490 through the switch 488, the rotating roller 34 is brought to contact with the length of tubing 14 by the action of the cam 206 and the tubing contact body 24 is withdrawn from the length of tubing 14. The heating element 36 is again placed into its operative position after which the severing wheel 26 severs a section S from the length of tubing 14 at the severing line L. The severed section S of tubing 14 falls into the receiving tray 40 whereupon the tray 40 is lowered to its discharged position and the section S is discharged onto appropriate conveying means 340. During this period of time the positioning mechanism has been moved such that it is in proper position to receive the newly cut end of the length of tubing 14 at the severing line L.

Upon successive severing operations on the length of tubing 14 and the feed path P that length of tubing is completely exhausted and the photoelectric cell 16 once again detects the absence of a length of tubing 14 within the feed path P and the cycle of operations as described above is repeated.

From the foregoing it will be appreciated that there is provided in accordance with the present invention a glass cutting machine which severs lengths of thermoplastic tubing into a plurality of longitudinal sections at relatively high rate of operation and at a relatively low unit cost. The machine is completely automatic once a supply of lengths of tubing had been placed in its supply hopper. Further the machine functions to trim a trimming section from the end of each new length of tubing automatically placed within the machine and is effective to thereafter locate heat and sever each length of tubing at the proper position to achieve a plurality of sections of tubing of desired lengths. Transfer and handling devices are provided within the machine to transfer new lengths of tubing into the feed path after previous lengths have been completely severed into the desired sections and to handle the lengths of tubing along the feed path as they are appropriately moved and severed. The present invention further provides a method whereby sections of thermoplastic tubing may be effectively severed from a plurality of lengths of the raw material of said sections.

A latitude of modification, change and substitution is intended in the foregoing disclosure and in some instances some features of the invention will be used without a use of other corresponding features. Accordingly, the claims herein should be construed broadly and in a manner consistent with the spirit and scope of the invention.

What we claim is:

1. A machine for severing lengths of thermoplastic tubing into a plurality of longitudinal sections comprising supply means to deliver one of said lengths at a time to a transfer location, guide means defining a feed path in communication with said transfer location, advancement means to periodically advance said length of tubing along said feed path a predetermined distance beyond a severing line, adjustable stop means defining a positioning location along said feed path at a distance beyond said severing line equal to the length of said longitudinal sections and adapted to stop said advancement at said positioning location, rotating means adapted to rotate said length of tubing in said feed path after said advancement is stopped, heating means at said severing line to heat said length of tubing, severing means adapted to sever a section from said length of tubing at said severing line, receiving means to receive said length of tubing after it has been severed, and control means to activate said aforementioned means in timed sequence.

2. A machine for severing lengths of thermoplastic tubing into a plurality of longitudinal sections comprising supply means to deliver one of said lengths at a time to a transfer location, guide means defining a feed path in communication with said transfer location, advancement means to periodically advance said length of tubing along said feed path a predetermined distance beyond a severing line, stop means at a positioning location along said feed path spaced beyond said severing line a distance equal to the length of said longitudinal sections and adapted to stop said advancement at said positioning location, rotating means adapted to rotate said length of tubing in said feed path after said advancement is stopped, severing means adapted to sever a section from said length of tubing at said severing line, receiving means to receive said length of tubing after it has been severed, detection means for detecting the absence of a length of tubing in said feed path and cooperating means to activate said supply means to deliver a further length of tubing to said feed path, and control means to activate said advancement means, to halt said advancement means when said length of tubing reaches said stop means, to thereupon activate said rotating means, to activate said severing means, and to repeat said cycle of operations a plurality of times.

3. A machine for severing an elongated length of tubing into a plurality of sections comprising a support, tubing transport means including guide means defining a feed path along which said length of tubing may travel and advancement means effective to move said tubing along said path, material supply means for delivering one length of tubing at a time to said feed path, an adjustable and movable stop adapted to halt the travel of said length of tubing along said feed path, for positioning the end of said tubing at a positioning location, severing means located at a severing location along said path spaced from said positioning location, means mounting said severing means for movement into and out of said feed path for selective engagement with said tube for severing the same, rotating means along said feed path effective to engage and rotate said tube during the operation of said severing means, means to detect the absence of a length of tubing in said feed path and cooperating means to activate said material supply means to deliver a length of tubing to said feed path, means to activate said advance means to advance said tubing beyond said severing location to said positioning location, means to concurrently position said stop at said positioning location, means to activate said rotating means after said tubing has reached said positioning location, means to concurrently deactivate said advancement means and to disengage said stop from said tubing, and means to advance said severing means into said feed path and into engagement with said tubing at said severing location for severing a section therefrom.

4. A machine for severing an elongated length of tubing into a plurality of sections comprising a support, material supply means effective to deliver one length of said tubing at a time to a transfer location, a tube transport means adapted to receive said length of tubing at said transfer location and including guide means defining a feed path along which said length of tubing may travel and advancement means effective to move said tubing along said path, an adjustable and movable stop adapted to halt the travel of said length of tubing along said feed path, means mounting said stop on said support for movement along said feed path for positioning said tubing at a positioning location, severing means located at a severing location along said path spaced from said positioning location, means mounting said severing means for movement into and out of said feed path for selective engagement with said tube for severing the same, rotating means along said feed path effective to engage and rotate said tube during the operation of said severing means, means to detect the absence of a length of said tubing in said feed path and cooperating means to activate said material supply means to deliver a length of tubing to said feed path, means to activate said advancement means to advance said tubing beyond said severing location to said positioning location, means to concurrently position said stop at said positioning location, means to move said rotating means into engagement with said tubing after said tubing has reached said positioning location, means to concurrently deactivate said advancement means and to disengage said stop from said tubing, and means to advance said severing means into said feed path and into engagement with said tubing at said severing location for severing a section therefrom.

5. A machine for severing an elongated length of tubing into a plurality of sections comprising a support, tube transport means including guide means defining a feed path along which said length of tubing may travel and advancement means effective to move said tubing along said path, an adjustable and movable stop adapted to halt the travel of said length of tubing along said feed path, said stop including a body movable along said feed path and adapted to engage the end of said tube and to position same along said feed path at said positioning location, severing means located at a severing location along said path spaced from said positioning location, means mounting said severing means for movement into and out of said feed path for selective engagement with said tube for severing the same, a heater along said feed path at said severing location and effective to heat said tubing to prepare same for the operation of said severing means, rotating means along said feed path effective to engage and rotate said tube during the operation of said severing means, means to activate said advancement means to advance said tubing beyond said severing location to said positioning location, means to concurrently position said body of said stop at said positioning location, means to activate said rotating means after said tubing has reached said positioning location, means to concurrently deactivate said advancement means, means to activate said heater, and means to advance said severing means into said feed path and into engagement with said tubing at said severing location for severing a section therefrom.

6. A machine for severing an elongated tubing into relatively short sections comprising a support, material supply means effective to deliver one length of said tubing at a time to a transfer location, a tube transport means adapted to receive said length of tubing at said transfer location and including guide means defining a feed path along which said length of tubing may travel and advancement means effective to move said tubing along said path, an adjustable and movable stop adapted to halt the travel of said length of tubing along said feed path, means mounting said stop on said support for movement into and out of said feed path for blocking and releasing functions and for movement along said feed path for positioning said tubing at a positioning location, said stop including a positioning body and a tubing contact body movable relative to said positioning body along said feed path and adapted to engage the end of said tube and to position same along said feed path at said positioning location, severing means located at a severing location along said path spaced from said transfer location and in advance of said positioning location, means mounting said severing means for movement into and out of said feed path for selective engagement with said tube for severing the same, a heater along said feed path at said severing location and effective to heat said tubing to prepare same for the operation of said severing means, rotating means along said feed path effective to engage and rotate said tube during the operation of said severing means, means to detect the absence of a length of said tubing in said feed path and cooperating means to activate said material supply means to deliver a length of tubing to said feed path, means to activate said advance means to advance said tubing beyond said severing location to said positioning location, means to concurrently position said stop at said positioning location, means to move said rotating means into engagement with said tubing after said tubing has reached said positioning location, means to concurrently deactivate said advancement means and to disengage said stop from said tubing, means to activate said heater, and means to advance said severing means into said feed path and into engagement with said tubing at said severing location for severing a section therefrom.

7. A severing machine according to claim 4 wherein said feed path and transfer locations are tilted with respect to the horizontal and wherein said material supply means comprises a frame, a horizontal tubing storage bin mounted on said frame, an inclined delivery chute having its upper end in communication with said storage bin, the lower end of said delivery chute terminating at a horizontal discharge opening, said delivery chute providing a supply path for the transverse travel of said lengths of tubing, a stop and feed mechanism adapted to release one of said lengths of tubing at a time from said delivery chute at said discharge opening including a first pivotally mounted blocking member and a second pivotally mounted blocking member, said first and second blocking members adapted for alternate movement into blocking positions at points spaced along said supply path substantially equal in distance to the diameter of said tubing, and interconnecting control means to move one of said blocking members into blocking position when the other of said blocking members is removed therefrom such that such movement is effective to release one length of tubing at a time from said supply path, an elongated tubing transfer device pivotally mounted on said frame for movement between a horizontal position where said transfer device is adapted to receive a length of tubing from said delivery chute at said discharge opening and a tilted position adjacent and parallel to said transfer station, pivot means mounting said transfer device for pivotal motion about its longitudinal axis, and activating means to pivot said transfer device about its longitudinal axis in response to movement to said tilted position to discharge said length of tubing from said transfer device to said transfer station.

8. A method for severing elongated tubing into a plurality of longitudinal sections comprising the steps of supplying a length of said tubing to a feed path, advancing said length of tubing along said feed path and beyond a severing location, blocking the advancement of the forward end of said tubing at a trim cut location such that a short trimming section extends beyond said severing location, rotating said tubing, severing said tubing at said severing location, further advancing said length of tubing along said feed path and beyond said severing location, blocking the advancement of the forward end of said tubing at a positioning location such that a portion of said tubing extends beyond said severing location which is equal in length to the desired length of said sections, rotating said tubing, severing said tubing at said severing location to sever said section from said length of tubing, repeating said sequence of advancement, blocking, rotating, and severing a plurality of times to sever a plurality of said sections from said tubing, detecting the absence of a length of tubing in the feed path after the severing of a plurality of sections and, in response to said detecting of the absence of a length of tubing, supplying a subsequent length of said tubing to said feed path, and successively repeating said sequences of steps a plurality of times to sever a plurality of lengths of said tubing.

9. A method for severing elongated thermoplastic tubing into a plurality of longitudinal sections comprising the steps of supplying a length of said tubing to a feed path, advancing said length of tubing along said feed path and beyond a severing location, blocking the advancement of the forward end of said tubing at a trim cut location by moving a stop into said feed path such that a short trimming section extends beyond said severing location, rotating said tubing, heating said tubing at said severing location, severing said tubing at said severing location to remove said short trimming section therefrom, further advancing said length of tubing along said feed path and beyond said severing location, blocking the advancement of the forward end of said tubing at a positioning location such that a portion of said tubing extends beyond said severing location which is equal in length to the desired length of said sections, rotating said tubing, heating said tubing at said severing location, severing said tubing at said severing location to sever said section from said length of tubing, repeating said sequence of advancement, blocking, rotating, heating and severing a plurality of times to sever a plurality of said sections from said tubing, detecting the absence of a length of tubing in said feed path after the severing of a plurality of sections and, in response to said detecting of the absence of a length of tubing, and supplying a subsequent length of said tubing to said feed path, and successively repeating said sequence of steps a plurality of times to sever a plurality of lengths of said tubing.

References Cited by the Examiner
UNITED STATES PATENTS

| | | | |
|---|---|---|---|
| 1,220,201 | 3/17 | Danner | 225—96.5 |
| 1,298,987 | 4/19 | MacNichol | 225—93.5 |
| 1,546,352 | 7/25 | Rippl | 49—48 |
| 1,888,851 | 11/32 | Donovan et al. | 221—180 |
| 1,981,892 | 11/34 | Dichter. | |
| 2,005,496 | 6/35 | Donovan et al. | |
| 2,157,067 | 5/39 | Brown et al. | 225—2 |
| 2,304,926 | 12/42 | Juvinall | 225—2 |
| 2,310,469 | 2/43 | Snyder | 225—93.5 |
| 2,521,352 | 9/50 | Dockerty et al. | 225—93.5 |
| 2,595,077 | 4/52 | Hughes et al. | 49—48 XR |
| 2,612,001 | 9/52 | Denlinger. | |
| 2,641,870 | 6/53 | Eisler | 225—93.5 |
| 2,839,871 | 6/58 | Austin | 49—48 |
| 2,870,938 | 1/59 | Sirles et al. | 221—183 |
| 2,878,620 | 3/59 | Calehuff et al. | 49—1 |
| 2,952,098 | 9/60 | Given | 49—48 |
| 2,993,304 | 7/61 | Kiraly. | |